(12) United States Patent
Webster et al.

(10) Patent No.: US 7,989,074 B2
(45) Date of Patent: Aug. 2, 2011

(54) THERMOSET SILOXANE-URETHANE FOULING RELEASE COATINGS

(75) Inventors: Dean C. Webster, Fargo, ND (US);
Robert J. Pieper, Fargo, ND (US);
Abdullah Ekin, Corapolis, PA (US)

(73) Assignee: NDSU Research Foundation, Fargo, ND (US)

( * ) Notice: Subject to any disclaimer, the term of this patent is extended or adjusted under 35 U.S.C. 154(b) by 539 days.

(21) Appl. No.: 11/810,696

(22) Filed: Jun. 6, 2007

(65) Prior Publication Data

US 2008/0213599 A1    Sep. 4, 2008

Related U.S. Application Data

(60) Provisional application No. 60/812,567, filed on Jun. 9, 2006.

(51) Int. Cl.
*C08L 83/08* (2006.01)
(52) U.S. Cl. ............ 428/447; 428/423.1; 428/450; 525/100; 525/102; 525/123; 525/165; 525/185; 525/190; 525/446; 528/38; 528/44; 528/83; 528/85
(58) Field of Classification Search .............. None
See application file for complete search history.

(56) References Cited

U.S. PATENT DOCUMENTS

| | | | |
|---|---|---|---|
| 4,125,491 A * | 11/1978 | Gorman .................. | 524/476 |
| 4,298,543 A | 11/1981 | Law et al. | |
| 4,687,813 A | 8/1987 | Lenz et al. | |
| 4,697,913 A * | 10/1987 | Kuramoto et al. .......... | 399/6 |
| 4,902,767 A | 2/1990 | Roitman et al. | |
| 4,910,252 A | 3/1990 | Yonehara et al. | |
| 4,933,178 A | 6/1990 | Capelli | |
| 5,001,210 A | 3/1991 | Coury et al. | |
| 5,019,096 A | 5/1991 | Fox, Jr. et al. | |
| 5,203,991 A | 4/1993 | Kutsuna et al. | |
| 5,237,082 A * | 8/1993 | Leir et al. .................. | 556/413 |
| 5,641,855 A | 6/1997 | Scherr et al. | |
| 5,986,018 A * | 11/1999 | Yamaguchi et al. ......... | 525/455 |
| 6,030,632 A | 2/2000 | Sawan et al. | |
| 6,099,897 A | 8/2000 | Sayo et al. | |
| 6,153,724 A | 11/2000 | Hollingsworth | |
| 6,224,579 B1 | 5/2001 | Modak et al. | |
| 6,369,186 B1 * | 4/2002 | Branlard et al. .............. | 528/26 |
| 6,387,997 B1 * | 5/2002 | Grolemund et al. ........... | 524/506 |
| 6,413,446 B1 | 7/2002 | Mechtel et al. | |
| 6,458,878 B1 | 10/2002 | Tsuboi et al. | |
| 6,482,912 B2 | 11/2002 | Boudjouk et al. | |
| 6,500,549 B1 | 12/2002 | Deppisch et al. | |
| 6,524,564 B1 * | 2/2003 | Kim et al. .................. | 424/70.12 |
| 6,559,201 B2 | 5/2003 | Simendinger, III | |
| 6,716,895 B1 | 4/2004 | Terry | |
| 6,861,493 B2 | 3/2005 | Bauer et al. | |
| 6,949,598 B2 | 9/2005 | Terry | |
| 7,098,256 B2 | 8/2006 | Ong et al. | |
| 7,141,183 B2 | 11/2006 | Hattori et al. | |
| 7,179,789 B2 | 2/2007 | Patt | |
| 7,204,940 B2 | 4/2007 | McDonald et al. | |
| 7,345,131 B2 | 3/2008 | Selbertinger et al. | |
| 7,378,156 B2 | 5/2008 | Terry | |
| 7,449,537 B2 | 11/2008 | Boudjouk et al. | |
| 7,452,956 B2 | 11/2008 | Cheng et al. | |
| 7,544,722 B2 | 6/2009 | Boudjouk et al. | |
| 2002/0013385 A1 | 1/2002 | Simendinger, III | |
| 2002/0098214 A1 | 7/2002 | Adams et al. | |
| 2002/0156223 A1 | 10/2002 | Boudjouk et al. | |
| 2003/0022793 A1 | 1/2003 | Ring et al. | |
| 2003/0044451 A1 | 3/2003 | McGhee et al. | |
| 2003/0129421 A1 | 7/2003 | Terauchi et al. | |
| 2003/0207962 A1 | 11/2003 | Oya et al. | |
| 2003/0236552 A1 | 12/2003 | Roby | |
| 2004/0116551 A1 | 6/2004 | Terry | |
| 2005/0009985 A1 | 1/2005 | Selbertinger et al. | |
| 2005/0080158 A1 | 4/2005 | Ong et al. | |
| 2005/0129962 A1 | 6/2005 | Amidaiji et al. | |
| 2005/0227092 A1 | 10/2005 | Yamaya et al. | |
| 2006/0014015 A1 | 1/2006 | Travelute et al. | |
| 2006/0223969 A1 | 10/2006 | Roesler et al. | |
| 2006/0252094 A1 | 11/2006 | Zhou et al. | |
| 2006/0276608 A1 * | 12/2006 | Lang et al. .................. | 528/25 |
| 2007/0021529 A1 | 1/2007 | Boudjouk et al. | |
| 2007/0032626 A1 | 2/2007 | Roesler et al. | |
| 2007/0042199 A1 | 2/2007 | Chisholm et al. | |
| 2007/0048344 A1 | 3/2007 | Yahiaoui et al. | |

(Continued)

FOREIGN PATENT DOCUMENTS

| | | |
|---|---|---|
| CA | 2 413 672 A1 | 8/2003 |
| CA | 2621000 | 3/2007 |
| EP | 1 496 079 A1 | 1/2005 |
| JP | 2-47371 | 2/1990 |
| WO | WO 2005/030405 A2 | 4/2005 |
| WO | WO 2006/086092 A2 | 8/2006 |
| WO | WO 2006/121937 A1 | 11/2006 |
| WO | WO 2007/053163 A2 | 5/2007 |
| WO | WO 2008/008077 A2 | 1/2008 |
| WO | WO 2009/025924 A2 | 2/2009 |

OTHER PUBLICATIONS

Bullock et al., "Surface Science of a Filled Polydimethylsiloxane-Based Alkoxysilane-Cured Elastomer: RTV11", *Journal of Colloid and Interface Science*, vol. 210, 1999 (pp. 18-36), Article ID jcis.1998.5856, available online at http://www.idealibrary.com.

Chen et al., "Solvent Effects on the Surface Composition of Poly(dimethylsiloxane)-*co*-Polystyrene/Polystyrene Blends", *Macromolecules*, vol. 31, No. 26, 1998 (pp. 9328-9336).

Ho et al., "Polydimethylsiloxane-Urea-Urethane Copolymers with 1,4-Benzenedimethanol as Chain Extender", *Macromolecules*, vol. 26, No. 25, 1993 (pp. 7029-7036).

(Continued)

*Primary Examiner* — Marc S Zimmer
(74) *Attorney, Agent, or Firm* — Foley & Lardner LLP

(57) ABSTRACT

A polymeric material may be prepared by reacting a mixture comprising an amino functional polyorganosiloxane, polyisocyanate, and polyol. The polyol may comprise a hydroxyfunctional poly(meth)acrylate. The polymeric material may be used as a coating for a substrate and may inhibit fouling on a surface exposed to aquatic conditions.

25 Claims, 29 Drawing Sheets

U.S. PATENT DOCUMENTS

| | | |
|---|---|---|
| 2007/0093618 A1 | 4/2007 | Cheng et al. |
| 2007/0112161 A1 | 5/2007 | Roesler et al. |
| 2007/0112164 A1 | 5/2007 | Roesler et al. |
| 2007/0129474 A1 | 6/2007 | Salamone et al. |
| 2007/0132949 A1 | 6/2007 | Phelan |
| 2008/0112920 A1 | 5/2008 | Chia et al. |
| 2008/0181862 A1 | 7/2008 | Chisholm et al. |
| 2008/0199536 A1 | 8/2008 | Terry |
| 2008/0213599 A1 | 9/2008 | Webster et al. |
| 2009/0018276 A1 | 1/2009 | Boudjouk et al. |
| 2009/0111937 A1 | 4/2009 | Webster et al. |
| 2009/0143496 A1* | 6/2009 | Ziche .................. 522/148 |
| 2009/0194733 A1 | 8/2009 | Schulz et al. |
| 2009/0215762 A1 | 8/2009 | Stafslien et al. |
| 2010/0004202 A1 | 1/2010 | Chisholm et al. |
| 2010/0204399 A1 | 8/2010 | Chisholm et al. |
| 2010/0280148 A1 | 11/2010 | Webster et al. |

OTHER PUBLICATIONS

Johnston et al., "Networks from α,ω-Dihydroxpoly(dimethylsiloxane) and (Tridecafluoro-1,1,2,2-tetrahydrooctyl)triethoxysilane: Surface Microstructures and Surface Characterization", Macromolecules, vol. 32, No. 24, 1999 (pp. 8173-8182).

Majumdar et al., "Thermoset Siloxane-Urethane Fouling Release Coatings", Department of Coatings and Polymeric Materials, Center for Nanoscale Science and Engineering, North Dakota State University, Fargo, ND 58105, Published Feb. 16, 2005, proceedings of Conference on Coatings, Orlando, Florida (9 pgs.).

PCT International Search Report, based on International Application No. PCT/US06/00120, date of mailing of the International Search Report Nov. 6, 2007 (7 pp.).

Pike et al., "Water-Induced Surface Rearrangements of Poly(dimethylsiloxane-urea-urethane) Segmented Block Copolymers", Chem. Mater., vol. 8, No. 4, 1996 (pp. 856-860).

Tezuka et al., "Environmentally induced Macromolecular Rearrangement on the Surface of Polyurethane-Polysiloxane Block Copolymers", J. Chem. Soc. Paraday Trans., vol. 87, 1991 (pp. 147-152).

Tezuka et al., "Environmentally Induced Macromolecular Rearrangement on the Surface of Polyurethane-Polysiloxane Graft Copolymers", Journal of Colloid and Interface Science, vol. 136, No. 2, May 1990 (pp. 408-414).

Thomas et al., "Silicones Containing Pendant Biocides for Antifouling Coatings", Biofouling, vol. 20, Nos. 4/5, Aug./Oct. 2004 (pp. 227-236 (whole document)).

Wynne et al., "Poly(dimethysiloxane)-Urea-Urethane Copolymers,", Synthesis and Surface Properties, Chapter 7, Ingoranic and Organometallic Polymers II, Am. Chem. Soc., 1994 (pp. 64-80).

Zhuang et al., "Determination of the Distribution of Poly(dimethylsiloxane) Segment Lengths at the Surface of Poly[(dimethylsiloxane)-urethane]-Segmented Copolymers by Time-of-Flight Secondary Ion Mass Spectrometry", Macromolecules, vol. 30, No. 4, 1997 (pp. 1153-1157).

Cassé et al., "Laboratory screening of coating libraries for algal adhesion," Biofouling, vol. 23(3/4), 2007 (pp. 267-276).

Ekin et al., "Combinatorial and High-Throughput Screening of the Effect of Siloxane Composition on the Surface Properties of Crosslinked Siloxane-Polyurethane Coatings," J. Comb. Chem., vol. 9, No. 1, 2007 (pp. 178-188).

Ekin et al., "Synthesis, formulation, and characterization of siloxane-polyurethane coatings for underwater marine applications using combinatorial high-throughput experimentation," J. Coat. Technol. Res., vol. 4(4), 2007 (pp. 435-451).

Ekin et al., "Library Synthesis and Characterization of 3-Aminopropyl-Terminated Poly(dimethylsiloxane)s and Poly(ε-caprolactone)-b-Poly(dimethylsiloxane)s," Journal of Polymer Science: Part A: Polymer Chemistry, vol. 44(16), 2006 (pp. 4880-4894).

Ekin et al., "Synthesis and Characterization of Novel Hydroxyalkyl Carbamate and Dihydroxyalkyl Carbamate Terminated Poly(dimethylsiloxane) Oligomers and Their Block Copolymers with Poly(ε-caprolactone)," Macromolecules, vol. 39(25), 2006 (pp. 8659-8668).

Majumdar et al., "Thermoset Siloxane-Urethane Fouling Release Coatings," A.C.S. Symposium Series, vol. 957, 2007 (pp. 61-75).

Majumdar et al., "Preparation of Siloxane-Urethane Coatings Having Spontaneously Formed Stable Biphasic Microtopographical Surfaces," Macromolecules, vol. 38, 2005 (pp. 5857-5859).

Pieper et al., "Combinatorial approach to study the effect of acrylic polyol composition on the properties of crosslinked siloxane-polyurethane fouling-release coatings," J. Coat. Technol. Res., vol. 4(4), 2007 (pp. 453-461).

Stafslien et al., "Combinatorial materials research applied to the development of new surface coatings IV. A high-throughput bacterial biofilm retention and retraction assay for screening fouling-release performance of coatings," Biofouling, vol. 23(1/2), 2007 (pp. 45-54).

Abstract for Japanase Publication No. JP 63-277222, "Curing Resin", date of publication Nov. 15, 1998 (1 pg.).

Abstract for Japanese Publication No. 04-370163, "Coating Composition," date of publication Dec. 22, 1992, 1 page.

Abstract for Japanese Publication No. JP 11-222402, Publication Date Aug. 17, 1999, Patentee or Applicant listed as Osaka Gas Co. Ltd., 1 page.

Abstract for Japanese Publication No. JP 2001-029451 (A), "Antibacterial Urethral Catheter and Manufacture of the same," Toyo Boseki et al., publication date Feb. 6, 2001, 1 page.

Abstract for JP 2000-264803, "Silver Microbide-Containing Photopolymerizable Monomer Compositions, and Solventless UV- or Electron Beam-Curable Resin Compositions Containing Them," Takeuchi et al., publication date Sep. 26, 2000, 1 page.

Abstract for JP 2003-327912, "Primer Antifouling Coating Material Composition for Ship, Composite Antifouling Coating Film for Ship, Method for Forming the Composite Antifouling Coating Film, Ship Coated with the Composite Antifouling Coating Film and Antifouling Method for Outer Hull of Ship," Masuda Hiroshi et al., publication date Nov. 19, 2003, 1 page.

U.S. Appl. No. 12/633,334, filed Dec. 7, 2009, Webster et al.

Abstract for JP 2007246576 (A), "Water Paint Composition," Matsushita et al., publication date Sep. 27, 2007, 1 page.

Abstract for JP 51-17554, "UV-Curable Antimicrobial Acrylic Coating Materials," Honda et al., publication date May 14, 1993, 1 page.

Abstract for JP 53-139653, "Marine Antifouling Material," Takamizawa Minoru et al., publication date Dec. 6, 1978, 1 page.

Abstract for JP 60-09919, "Crosslinked Urethane Acrylate Polymer Particle-Containing Antimicrobial Coatings," Honda et al., publication date Jan. 18, 1994, 1 page.

Abstract for JP 63-270738, "Polyamine/Polysiloxane Block Copolymer," Tezuka Yasushi et al., publication date Nov. 8, 1988, 1 page.

Adhikari et al., "Mixed Macrodiol-Based Siloxane Polyurethanes: Effect of the Comacrodiol Structure on Properties and Morphology," Journal of Applied Polymer Science, 2000, vol. 78, pp. 1071-1082.

Chen et al., "Macromolecules," 1995, vol. 28, pp. 1635-1642.

El-Hayek et al., Bacteriostatic polymer film immobilization. Journal of biomedical materials research. Part A 2006, vol. 79 No. 4, pp. 874-881 (Plus Cover Sheet, 9 pages total).

Ha et al., Journal of Macromolecular Science, Polymer Reviews, 2005, vol. C45, 32 pgs.

Holohan et al., "Monofunctional polydimethysiloxane oligomers for graft copolymerization," Macromol. Chem. Phys., 1994, vol. 195, No. 9, pp. 2965-2979 (Plus cover Sheet, 16 pages total).

Iojoiu et al., "Modified poly (ε-caprolactone)s and their use for drug-encapsulating nanoparticles," Journal of Polymer Science Part A: Polymer chemistry, 2004, vol. 42, No. 3, pp. 689-700.

Jiang et al., Preparation of crosslinked polystyrenes with quaternary ammonium and their antibacterial behavior Reactive & Functional Polymers 2005, vol. 62, 5 pages.

Karal et al., "Blend of polycaprolactone-poly (dimethylsiloxane)-polycaprolactone triblock copolymer with poly(vinyl chloride) preparation and characterization," Polymer, 1997, vol. 38, No. 24, pp. 6071-6078.

Kawakami et al., "Silicone Macromers for Graft Polymer Synthesis," Polymer Journal, 1982, vol. 14, No. 11, pp. 913-917.

Lee et al., *Journal of Applied Polymer Science*, 2003, vol. 87, pp. 375-380.

Lenoir et al., Antimicrobial activity of polystyrene particles coated by photo-crosslinked block copolymers containing a biocidal polymethacrylate block. *e-Polymers 200*, 11 pages.

Mahoney et al., *Macromolecules*, 2002, vol. 35, pp. 5256-5266.

Patel et al., *Macromolecules*, 1988, vol. 21, pp. 2689-2696.

Schweizer, Triclosan: a widely used biocide and its link to antibiotics. *FEMS Microbiology Letters*, 2001, vol. 202, No. 1, pp. 1-7 (Plus Cover Sheet, 9 pages total).

Smetankina et al., "Reactivity of organosilicon diisocyanates," XVII, Carcofunctional organosilicon compounds, Zhurnal Obshchei Khimii, 1974, vol. 44, No. 12, pp. 2638-2641.

Smith et al., *Macromolecules*, 1992, vol. 25, pp. 2575-2581.

Tanaka, et al., *Physical Review Letters*, 1992, vol. 68, No. 18, pp. 2794-2797.

Tang et al., "Anti-inflammatory properties of triblock siloxane copolymer-blended materials", Biomaterials, 1999, vol. 20, pp. 1365-1370 (Plus Figure, 6 pages total).

Wynne et al., *ACS Symposium Series*, 1994, vol. 572, pp. 64-80.

Yilgor et al., "Novel triblock siloxane copolymer: Synthesis, characterization, and their use as surface modifying additives," Journal of Polymer Science Part A: Polymer chemistry, 1989, pp. 3673-3690.

Majumdar et al., "Influence of Solvent Composition and Degree of Reaction on the Formation of Surface Microtopography in a Thermoset Siloxane-Urethane System," *Polymer*, 47, 4172-4181 (2006).

* cited by examiner

| DC 3140 | PDMS-PU-1 | PDMS-PU-2 |
|---|---|---|
| T2 SILASTIC | PDMS-PU-3 | PDMS-PU-4 |
| DC 3140 | PDMS-PCL-PU-1 | PDMS-PCL-PU-2 |
| T2 SILASTIC | PDMS-PCL-PU-3 | PDMS-PCL-PU-4 |

FIG. 21

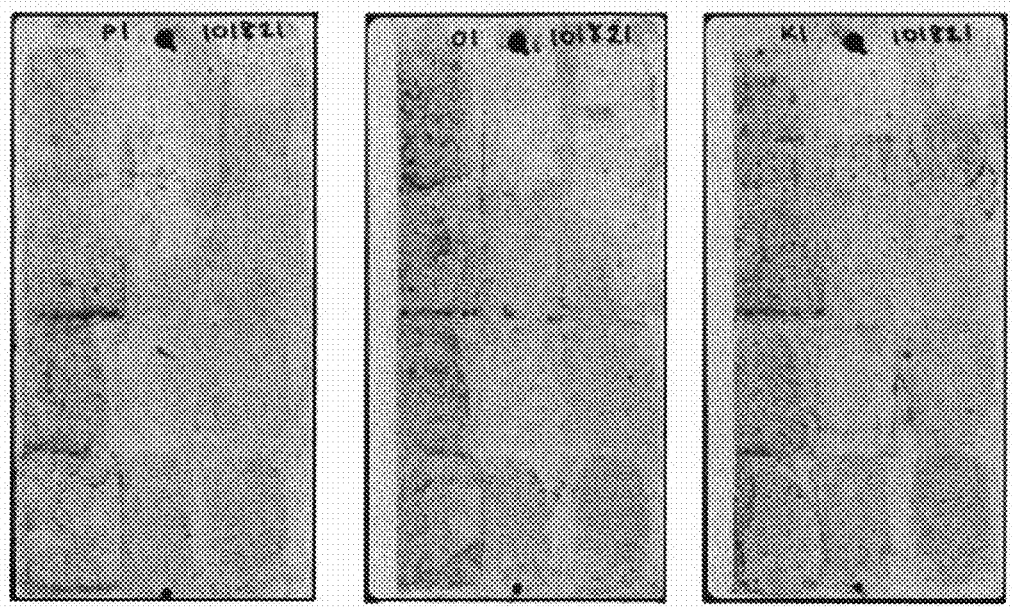
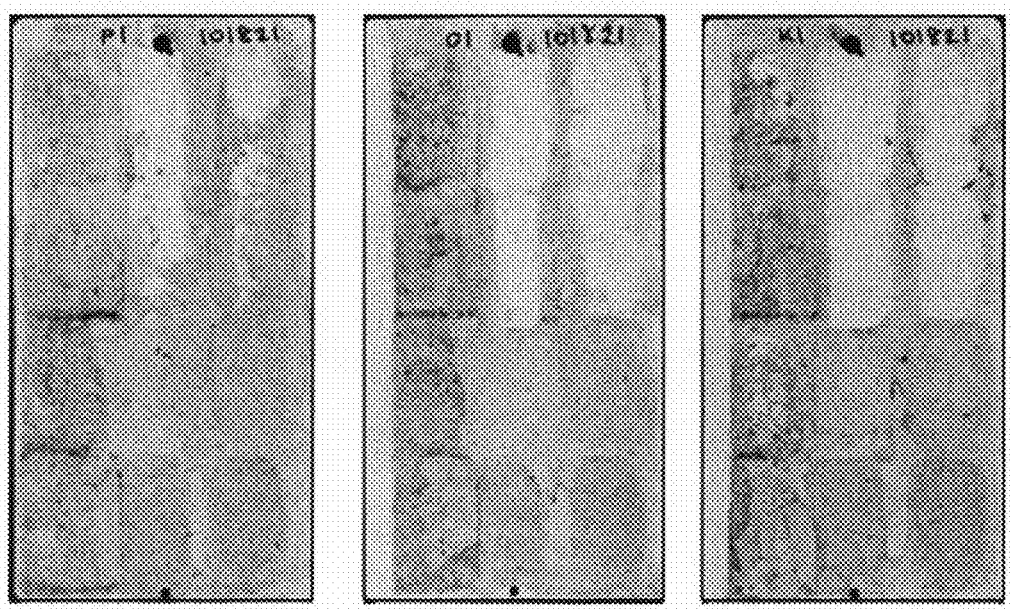
FIG. 22A

THERMOSET SILOXANE-URETHANE FOULING RELEASE COATINGS

CROSS REFERENCE TO RELATED APPLICATION

This application is an application claiming the benefit under 35 USC 119(e) U.S. Application 60/812,567, filed Jun. 9, 2006, which is incorporated herein by reference in its entirety.

GOVERNMENT RIGHTS STATEMENT

This invention was made with government support under Grant Nos. N00014-03-1-0702, N00014-04-1-0597, N00014-04-1-0822 awarded by the Department of Defense, Office of Naval Research. The government has certain rights in the invention.

BACKGROUND

Fouling of ship hulls by marine organisms has plagued shipping activities for millennia. Fouling presents a significant drag penalty, reducing the efficiency of propulsion and resulting in the expenditure of excess fuel to overcome the drag in order to meet target cruising speed. Fouling also results in the transport of organisms from foreign ecosystems and can result in the introduction of invasive species. Thus, from both an operational and ecological point of view, methods to reduce or eliminate fouling are necessary. Biological fouling of marine organisms on ships has serious consequences for ship performance and mission capability. Fouling results in a rougher surface and an increase in the overall drag of the ship. These may result in increasing the fuel consumption by as much as 40% and overall voyage cost of up to 77%.

While a number of approaches have been taken to prevent fouling, the most successful approach has been the use of coatings containing biocidal chemicals. Organisms are simply killed and either do not settle or are easily removed. Organo-tin and copper compounds have been in use since the 1970s. Although highly effective at reducing fouling, these biocidal agents have been linked to environmental problems. Release of the compounds from the coatings has led to sediment accumulations of the toxins resulting in harm to non-targeted sea life (e.g., oysters). The International Maritime Organization proposed a ban on new applications of organo-tin coatings starting in 2003 and complete removal of these coatings from all ships by 2008. While organo-tin compounds will initially be replaced by other less toxic biocides, such as copper or organic biocides, coating systems that do not leach any kind of biocidal compounds are desired.

Fouling release (FR) coatings appear to be a leading non-toxic alternative to biocide containing coatings. These are coating systems that do not necessarily prevent the settlement of marine organisms, but permit their easy removal with the application of shear to the surface of the coating. Ideally, the hydrodynamic shear on the hull as a ship reaches cruising velocity would be sufficient to remove fouling organisms. Coatings that are also easily cleaned using a water jet are, however, also desired. The most successful of such coatings to date are based on silicone elastomers. It has been shown that coatings with low modulus and low surface energy can often provide easy release of fouling organisms. Due to their low modulus, however, these coatings are very often easily damaged. In addition, such FR coatings may also suffer from poor adhesion, poor durability, and high cost.

SUMMARY

The present application is directed to polymeric material which may be used to form fouling release coatings, e.g., for use in protecting boat hulls. The polymeric material may be prepared by reacting a mixture comprising: polyisocyanate; polyorganosiloxane having functional groups capable of reacting with the polyisocyanate; and polyol. The polyorganosiloxane typically has an average molecular weight of at least about 2000. Suitable polymeric materials include those prepared by reacting a mixture comprising: an amino functional polyorganosiloxane (e.g., having a molecular weight of at least about 2000); polyisocyanate; and polyol, such as a polycaprolactone polyol and/or a hydroxy-functional poly(meth)acrylate.

Methods of inhibiting fouling on a surface exposed to aquatic conditions, such as a boat hull, comprising applying a fouling release coating composition to at least a portion of said surface hull are also provided. The application also describes surfaces designed to be exposed to aquatic conditions (e.g., salt water conditions such as seawater or fresh water conditions, such as found with materials in contact with lake or stream water), which are protected with a coating including the polymeric materials described in the present application.

BRIEF DESCRIPTION OF THE DRAWINGS

FIG. 21 shows position of the coatings on the array panels.

DETAILED DESCRIPTION

Figure 1:
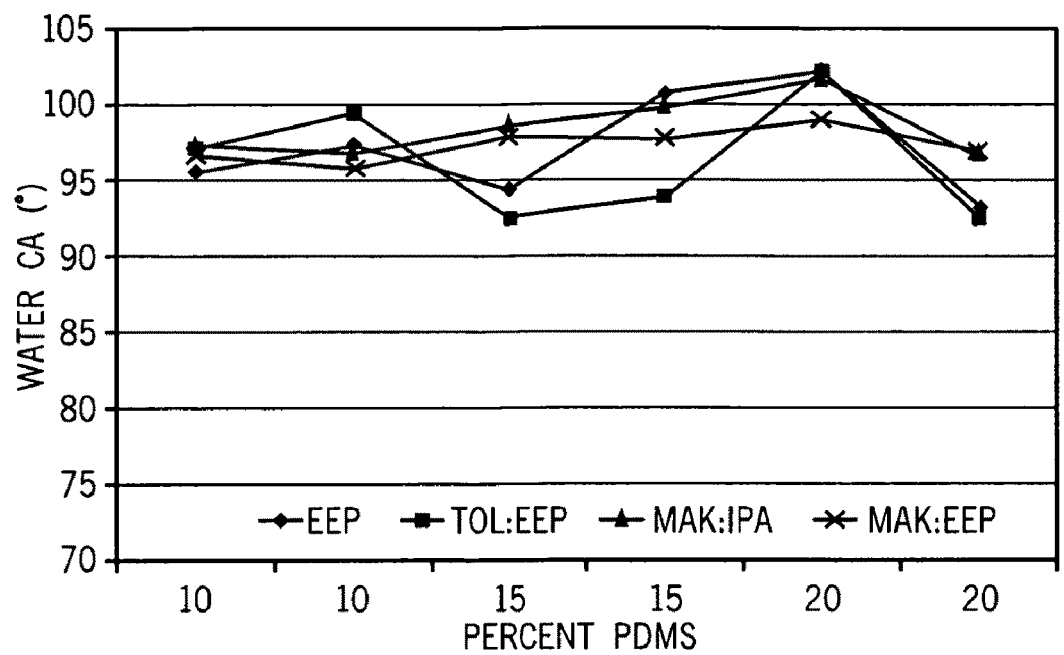
FIG. 1 shows initial water contact angle data for Library A, wherein the data series represent solvent composition of the coating formulations.

To provide coatings that exhibit fouling release behavior while also yielding improved durability, self-stratifying coatings that phase separate into a low surface energy, low modulus top layer, with a tougher lower layer can be designed. Self-stratifying coatings are coatings that are applied in a single step, but then spontaneously phase separate into two or more distinct layers upon application and film formation. Surface energy and viscosity are the main driving and/or controlling forces for self-stratification. A coating composed of polymeric material with poly(dialkylsiloxane) (e.g., poly (dimethylsiloxane); "PDMS") and polyurethane subunits may meet these requirements. Since surface energy is a primary driving force, the PDMS component will form the top, low energy, rubbery layer. The polyurethane component will form the tough durable underlayer. An additional advantage of this system is that the isocyanate resins used to form the polyurethane may react with residual hydroxyl groups on the epoxy anticorrosion primer, providing good adhesion, thus eliminating the need for a tie layer between the corrosion coating and the fouling-release coating.

Siloxane-polyurethane block and graft copolymers have been evaluated for use as anti-fouling coating systems. While these systems had good initial fouling release behavior, performance degraded significantly after prolonged exposure to water. This was found to be due to migration of the hydrophilic hard block segments to the surface, resulting in a change in surface energy. These systems, however, were thermoplastic coatings, while the present approach results in crosslinked coatings. The presence of crosslinking is expected to lock the structure in place and result in coatings that do not rearrange on exposure to water.

In these coatings the polymer system will typically include an organofunctional poly(dialkylsiloxane), an organic polyol, and a polyisocyanate crosslinker. A large number of variables are expected to influence the development of the stratified structure, the thickness of the PDMS layer, and the toughness of the coating system. For example, the molecular weight of the PDMS segment may determine the thickness of the top layer of the coating. The amount of PDMS relative to the other components is also expected to play a role. The reactive end group (hydroxyl alkyl, amino alkyl) of the PDMS will influence its reactivity with the isocyanate crosslinker. The composition and functionality of the polyol and the isocyanate used in the polyurethane component will affect the modulus and crosslink density of the coating system. A number of additional formulation variables are also expected to play a significant role. The solvent composition can affect the compatibility of the various components initially and influence the compatibility as the coating cures. Finally, the cure speed, compatibility of the oligomers, and the solvent evaporation rates will all operate simultaneously to influence the development of the network and the two-phase structure of the coating.

Organofunctional poly(dialkylsiloxane)s, such as organofunctional PDMS polymers, are well known in the literature.

Common organofunctional groups include hydroxypropyl, hydroxybutyl, hydroxypentyl, amino propyl, glycidoxypropyl, and the like.

Crosslinked polyurethane coatings are well known in the literature and are commonly formed from an organic polyol and a polyisocyanate. Catalyst, pot life extender, solvents, etc. are commonly used in formulations.

Suitable organic polyols can be any polyol typically used to form crosslinked coatings. These can include polyester polyols, polyether polyols, polycarbonate polyols and acrylic polyols. A mixture of polyols can also be used in formulating a polyurethane coating.

Polyester polyols can include those made from the melt polycondensation of polyfunctional acids with polyfunctional alcohols or those made from the ring opening polymerization of cyclic monomers such as epsilon-caprolactone.

Acrylic polyols are typically made from the free radical polymerization of a mixture of ethylenically unsaturated monomers. One of the monomers must bear a hydroxyl functional group. Hydroxy-functional monomers include hydroxyethyl acrylate, hydroxyethylmethacrylate, hydroxypropyl acrylate, and hydroxypropyl methacrylate In general, the polymeric material may be prepared by reacting a composition that includes polyol, polyisocyanate, and polyorganosiloxane that has functional groups capable of reacting with the polyisocyanate. In order to cross link the polymeric material, at least one of the polyol, polyisocyanate, or the polyorganosiloxane includes at least three functional groups which can react with the other components in the composition. For example, in one embodiment, the polyol may include three or more hydroxy groups or the polyisocyanate may include three or more isocyanate groups. In some embodiments where more cross linking is desired, the composition may include polyol having at least three hydroxy groups and polyisocyanate having at least three isocyanate groups.

The polyol used to prepare the polymeric material may be any of a number of polyols. Suitable polyols may include polyester polyols, polyether polyols, polycarbonate polyols, and acrylic polyols. As mentioned previously, the polyol may have at least three hydroxy groups to facilitate cross linking of the polymeric material. In one embodiment, the polyol may include polycaprolactone polyol such as a polycaprolactone triol.

Any of a number of suitable polyisocyanates may be used to prepare the polymeric material. As mentioned previously, the polyisocyanate may have at least three isocyanate groups to facilitate cross linking of the polymeric material. In one embodiment, the polyisocyanate may include an isophorone based polyisocyanate.

Any of a number of polyorganosiloxanes may be used as long as it is capable of reacting with the polyisocyanate. For example, the polyorganosiloxane may include hydroxy or amino functional polyorganosiloxane such as hydroxy or amino functional PDMS. In one embodiment, the polyorganosiloxane may include hydroxy or amino alkyl functional polyorganosiloxane such as hydroxy and/or amino propyl functional polyorganosiloxane. One suitable polyorganosiloxane may be α,ω-bis[3-(2'-hydroxyethoxy)propyl]polydimethylsiloxane. The functionalized polydialkylsiloxane may have any suitable molecular weight. Commonly, functionalized polydialkylsiloxane having an average molecular weight of at least about 2,000, desirably about 5,000 to 50,000 and, more desirably, about 10,000 to 25,000 may be employed to form the present polymeric materials.

A coating composition may be prepared which can be applied to a substrate so that upon curing the polymeric material described herein is formed. The coating composition may include polyol, polyisocyanate, polyorganosiloxane, and a solvent component. The solvent component may include alkyl propionate (e.g., lower alkyl propionate, preferably having 5 to 10 carbon atoms), alkoxypropionate, alkyl alkoxypropionate (e.g., lower alkyl alkoxypropionate, preferably having 5 to 10 carbon atoms), alkoxyalkyl propionate (e.g., alkoxyalkyl propionate having 5 to 10 carbon atoms), dialkyl ketone (e.g., dialkyl ketone having 5 to 10 carbon atoms), alkyl acetate (e.g., lower alkyl acetate, preferably having 5 to 10 carbon atoms), alkyl alkoxyacetate (e.g., lower alkyl alkoxyacetate, preferably having 5 to 10 carbon atoms), alkoxyalkyl acetate (e.g., alkoxyalkyl acetate having 5 to 10 carbon atoms), toluene, and/or xylene. In one embodiment, the solvent component may include ethyl 3-ethoxypropionate (EEP), methyl n-amyl ketone (MAK), and/or butyl acetate. The coating composition may also include a pot life extender such as alkane-2,4-dione (e.g., 2,4-pentadione), N,N-dialkyl acetoacetamide, or alkyl acetoacetate.

EXPERIMENTAL EXAMPLES

The following examples are provided by way of illustration and are not intended to limit the scope of the claims. All percentages are by weight unless otherwise noted.

Experimental I

Materials

Solvents methyl n-amyl ketone (MAK), butyl acetate (BA), and ethyl 3ethoxy propionate (EEP) were obtained from Eastman Chemical Company. Aromatic 100, toluene, and mixed xylenes, dibutyl tin diacetate (DBTDA), and 2,4-pentanedione (PDO), were obtained from Aldrich. Polycaprolactone triol (Tone 0305, PCL) was obtained from Dow Chemical. Polyisocyanates Tolonate XIDT 70B and HDT 90 were, obtained from Rhodia. These are isocyanurate trimers of isophorone diisocyanate and hexamethylene diisocyanate, respectively. Desmodur N3600 was obtained from Bayer; this is a trimer of hexamethylene diisocyanate with a narrow molecular weight distribution. Octamethylcyclotetrasiloxane (D4) and 1,3-bis(3-aminopropyl)-1,1,3,3tetramethyldisiloxane were obtained from Gelest. The bis(hydroxyethyloxypropyl) PDMS of MW=10,000 g/mole was obtained from Chisso. The structures of the materials used are shown in Scheme 1.

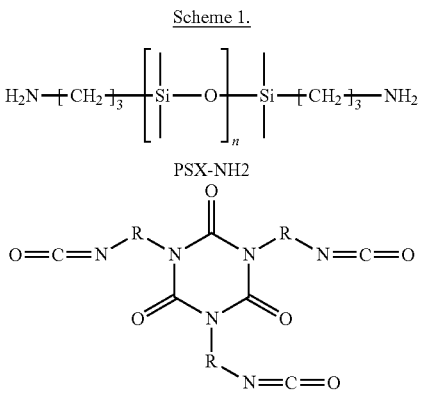

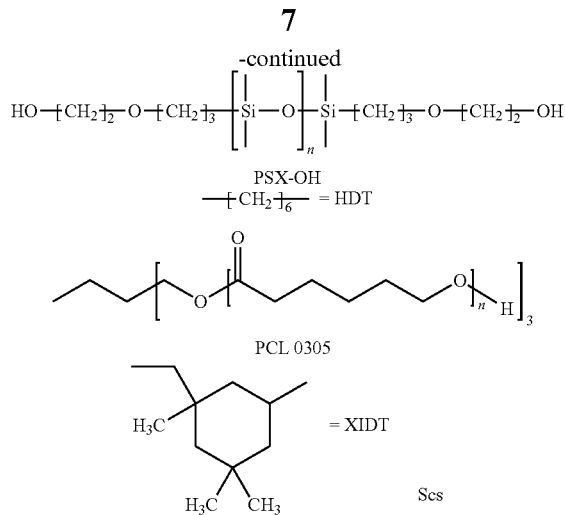

PSX-OH

—(CH₂)₆— = HDT

PCL 0305

= XIDT

Scs

Synthesis of Aminopropyl Terminated Polydimethylsiloxane

The synthesis of an aminopropyl terminated polydimethylsiloxane (PSXNH2) of amine equivalent weight 6,000 (~12,000 MW) was carried out as follows: In a 250-mL three necked round bottom flask 2.04 g 1,3-bis(3-aminopropyl)-1,1,3,3-tetramethyldisiloxane and 10 g D4 were mixed. The solution was heated with stirring under nitrogen. When the temperature reached 80° C., 0.1% catalyst (tetramethylammonium 3-aminopropyl dimethylsilanolate) was added. After one hour of heating the viscosity increased slightly, and the remaining D4(90 g) was placed into an addition funnel and added dropwise to the solution. After the completion of the addition of the D4 (7-10 hours), the heating was continued for an additional 2-3 hours. Then, the temperature was increased from 80° C. to 150° C. and kept at that temperature to decompose the catalyst. The reaction mixture was then cooled to room temperature. The PDMS polymer having an amine equivalent weight of 12,000 g/eq ~24,000 MW) was prepared using a similar procedure.

Formulation and Application

Formulations were prepared using a Symyx automated formulation system. Libraries were designed using Symyx Library Studio software. All libraries consisted of 24 compositions in a 4×6 array format. Isocyanate to hydroxyl (or hydroxyl plus amine) ratio was 1.1:1.0 in all cases. All libraries used PCL 0305 as the organic polyol. The PDMS, isocyanate used, and key variables for each library evaluated are summarized in Table I. Catalyst, DBTDA, was 0.01 weight percent based on resin solids. Ten percent 2,4pentanedione was used in all formulations as a pot life extender. All reagents except for the crosslinker were dispensed to the entire array according to the design and mixed with magnetic stirring. The crosslinker was then dispensed to each vial and mixed. The library was then transferred to the Symyx coating application system and 24 coatings drawn down in array format over aluminum test panels. Coatings were cured in an oven at 80° C. for 1 hour. Film thickness was approximately 25-50 μm.

TABLE I

Summary of the Libraries Prepared

| Library | PDMS (MW) | Isocyanate | Row | Column |
|---------|-----------|------------|------|--------|
| A | PSX-NH2 (24K) | XIDT | Solvent | % PDMS |
| B | PSX-NH2 (24K) | HDT | Solvent | % PDMS |
| C | PSX-NH2 (12K) | XIDT; HDT | Time | Mixed; Solvent, Isocyanate |
| D | PSX-OH(10K) | N3600 | % PDMS | Solvend |

Coating Screening

Coatings were screened for initial surface energy using an automated contact angle system. The water contact angle (CA) data reported is the average of three measurements. To check for surface stability, coating panels were aged in deionized water, the coatings were dried and surface energy measurements were made again. Coatings were analyzed for adhesion using a Symyx automated adhesion tester. In this test, aluminum studs are attached to the coating samples using an epoxy adhesive (Hysol Epoxy Patch 1C). Following curing, an automated pull-off device pulls the stud and measures the maximum force at release. Three adhesion tests are conducted per coating sample.

Results and Discussion

In order to identify a siloxane-urethane composition that has a suitable combination of properties, a number of variables must be explored over a wide range. The high throughput approach is a methodology that can be used to accelerate this process, allowing us to screen a large number of variables in a single experiment.

In these experiments, we are interested in exploring several variables that will lead to a stable hydrophobic surface, determining the effect of the amount of PDMS on the surface properties, and also identifying key variables that affect the release properties of the coatings. To this end, we prepared a series of combinatorial libraries to explore these variables.

In preliminary experiments, to establish starting points for more detailed experimentation, we explored the use of several different PDMS polymers having reactive endgroups (aminopropyl, hydroxypropyl, etc.), several commercially available polyols, catalysts, solvent mixtures, and the use of a pot life extender. In a combinatorial experiment, having a suitable pot life for the coating formulations is important since the first coating mixed must not gel before the last coating in a library is mixed. 2,4-Pentanedione was found to function as an effective pot life extender for these coatings. Coatings prepared both with and without the pot life extender in the laboratory had the same physical and mechanical properties.

Poly(dimethylsiloxane) has a much lower solubility parameter than the other oligomers and components used in the formulation of these coatings. Thus, we found that finding a solvent blend that would help compatibilize all of the coating components in solution was challenging, but necessary. With some solvent mixtures, as soon as the agitation was stopped, the coating formulation would phase separate into two distinct layers. Attempts at making coatings from this kind of unstable mixture usually resulted in gross phase separation of the PDMS to the surface of the coating such that the PDMS had not reacted with the isocyanate and so was not chemically incorporated.

Library A was designed using an aminopropyl terminated PDMS with the polycaprolactone triol as the organic polyol and IPDI trimer (XIDT) as the crosslinker. Since amines react more readily with isocyanate than hydroxyls, it was thought that using an aminopropyl terminated PDMS would help ensure that the PDMS was incorporated into the polyurethane network. The amine reactive groups could begin reacting with the isocyanate after the coating was mixed. The PDMS range was 10-20 percent. In addition, we wanted to explore the effect of solvent on the properties of the coatings and formulated the system using several different solvent compositions. The initial water contact angle data for the library is given in FIG. 1. All of the coatings prepared in this experiment are initially hydrophobic (CA>90).

Figure 2A:
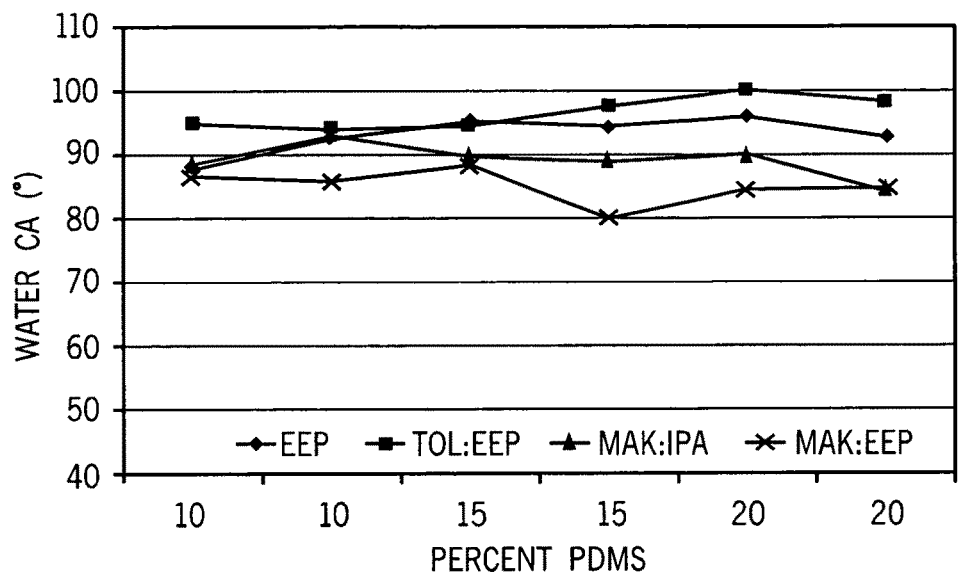
FIG. 2 shows water contact angle and contact angle change of Library A after immersion in deionized water for 30 days.
Figure 2B:
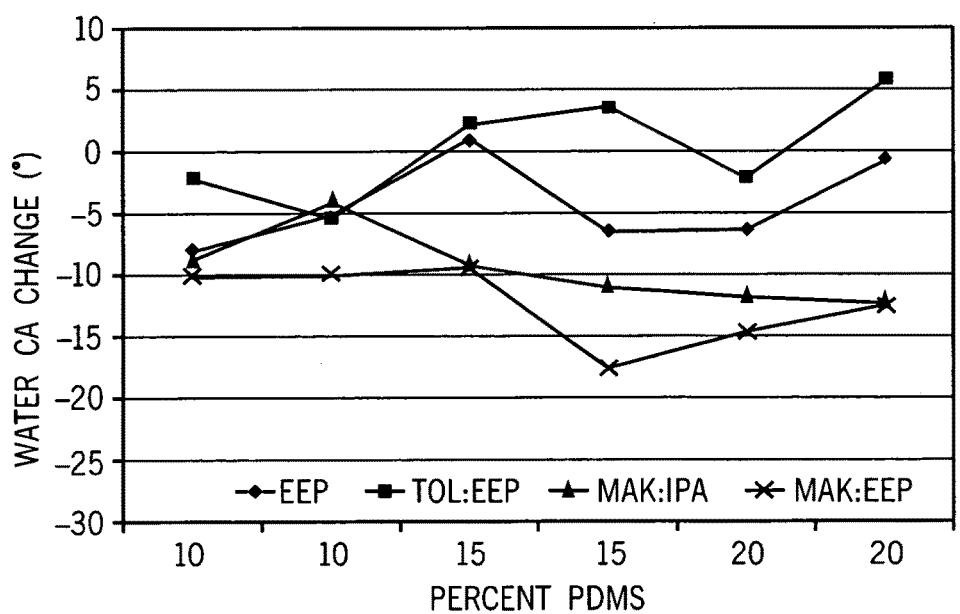

The contact angle data and change in contact angle after 30 days of water immersion for this library is given in FIG. 2. While most of the coatings had a decrease in contact angle, the decrease in contact angle is not excessive and many of the coatings remained hydrophobic. In contrast, several of the coatings that had used a mixture of toluene and EEP as the solvent blend became slightly more hydrophobic.

Figure 3:
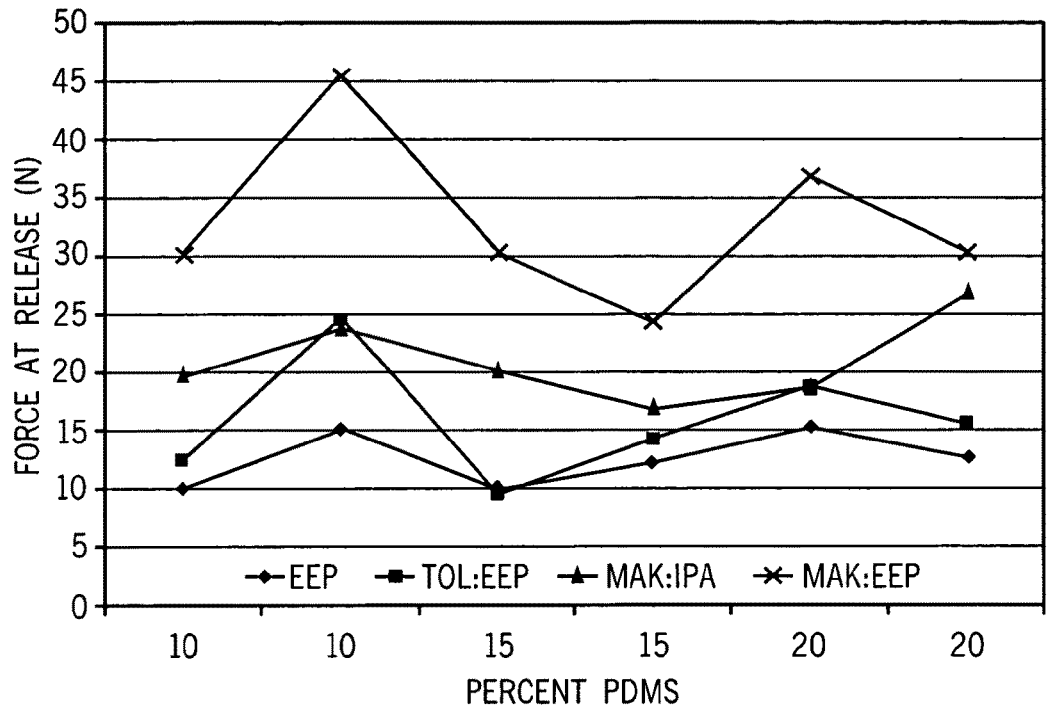
FIG. 3 shows pull-off adhesion data of Library A.

The automated pull-off adhesion system was used to determine the adhesion of this series of coatings. This test measures the force required to remove an epoxy from the surface of the coating, and may be indicative of how strongly a barnacle would adhere to the coating. In FIG. 3 a strong trend is observed depending on the solvent used with the coatings made using EEP as the solvent having the lowest release force. We believe this to be a manifestation of the morphology of the coating system that is developed during the curing process. Consider the fact that this is a highly dynamic system once the crosslinker is mixed into the coating formulation. At this stage the isocyanate can begin to react with the polyol and the PDMS. Following application to the substrate, the low surface energy PDMS will tend to migrate to the air interface (the coating surface) and also phase separate from the polyurethane component. While the initial solvent blend helps compatibilize the components, as the solvents evaporate at different rates from the coating, the compatibility can also be changing. All of this can contribute to the extent of phase separation and result in different self-stratified morphologies. This variation in morphology is reflected in the pull-off adhesion data. The lowest pull-off adhesion value is achieved when the slowest evaporating solvent is used in the system, EEP, followed by coatings prepared using a mixture of EEP and toluene.

Figure 4:
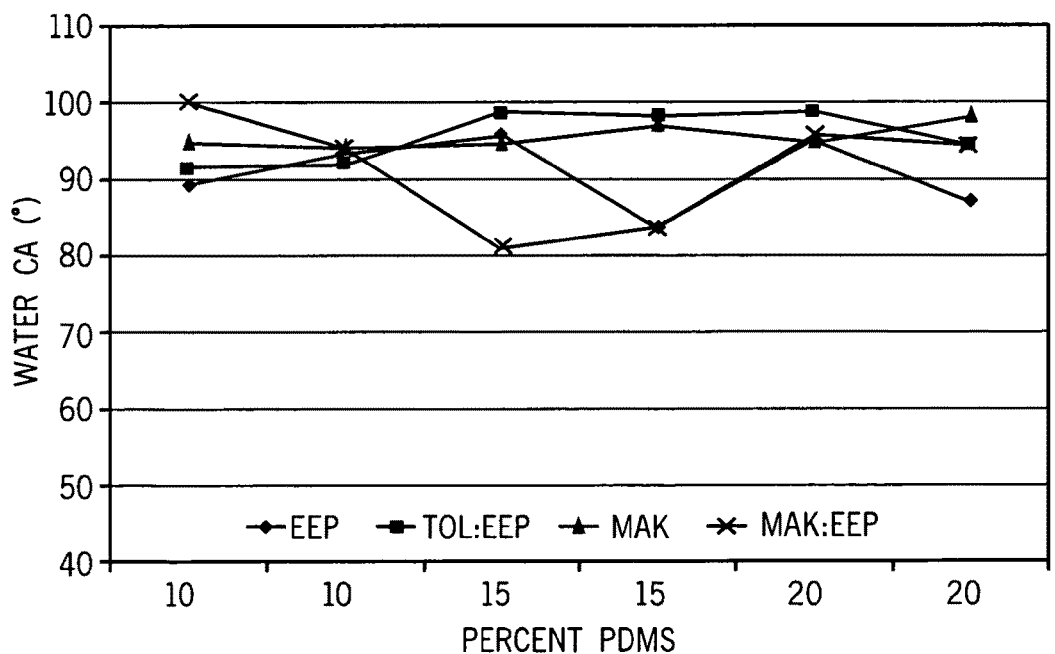
FIG. 4 shows water contact angle data for Library B.
Figure 5:
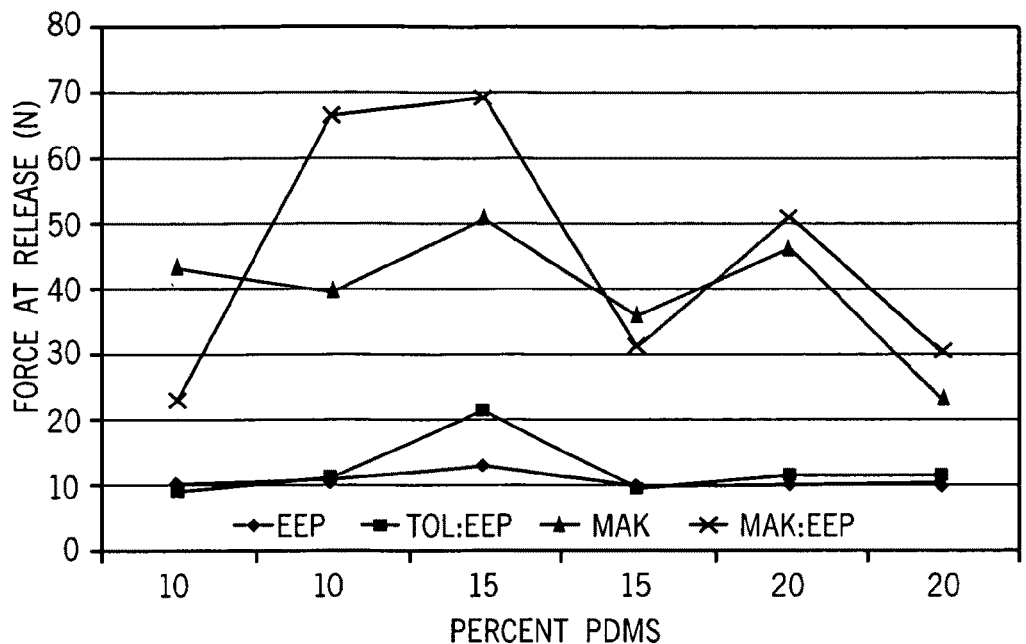
FIG. 5 shows pull-off adhesion data for Library B.

A similar library to the previous one was prepared with the exception that the crosslinker was a triisocyanurate of hexamethylene diisocyanate (HDT) (Library B). The initial contact angle data is shown in FIG. 4 and indicates that, with a few exceptions, most of these coatings are initially hydrophobic. The pull-off adhesion again shows a dramatic effect of the solvent used (FIG. 5). The coatings made using either EEP or a combination of toluene and EEP had the lowest removal force.

Figure 6:
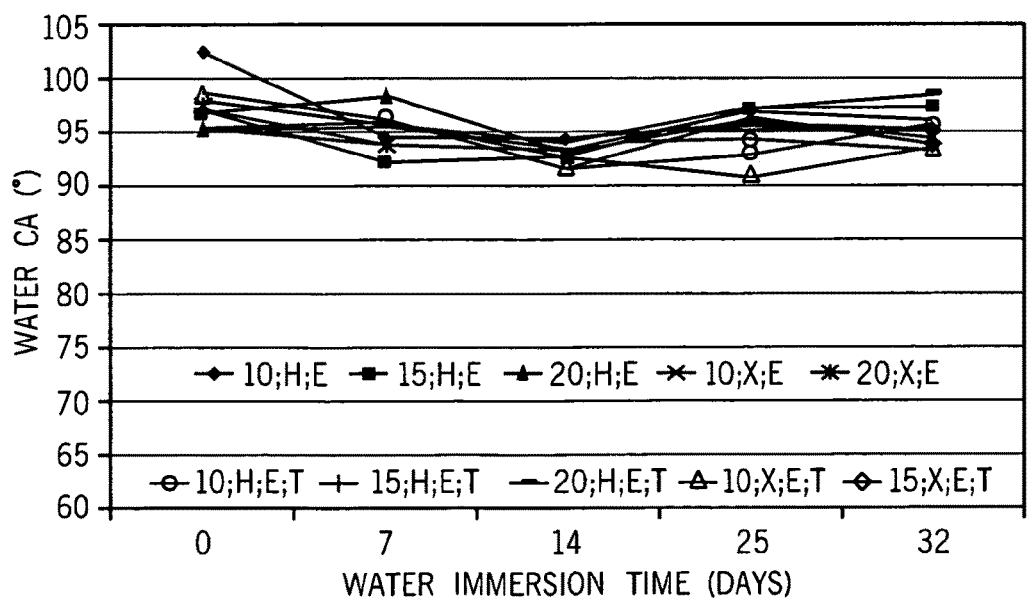
FIG. 6 shows water contact angle data for Library C wherein data series are given as Percent PDMS:Isocyanate (H=HDT; X=XIDT):Solvent (E=EEP,E:T=EEP and Toluene blend).

A lower molecular weight aminopropyl PDMS was used to prepare Library C and this library was designed to survey a range of PDMS levels (10, 15, 20 percent) using the two isocyanate crosslinkers and the two best solvent systems. The water contact angle was determined weekly for four weeks. As can be seen in FIG. 6, the coatings were all hydrophobic and remained hydrophobic during the testing period. This indicates that these coatings do not undergo significant reorganization in an aqueous environment and maintain their hydrophobic surfaces.

Figure 7:
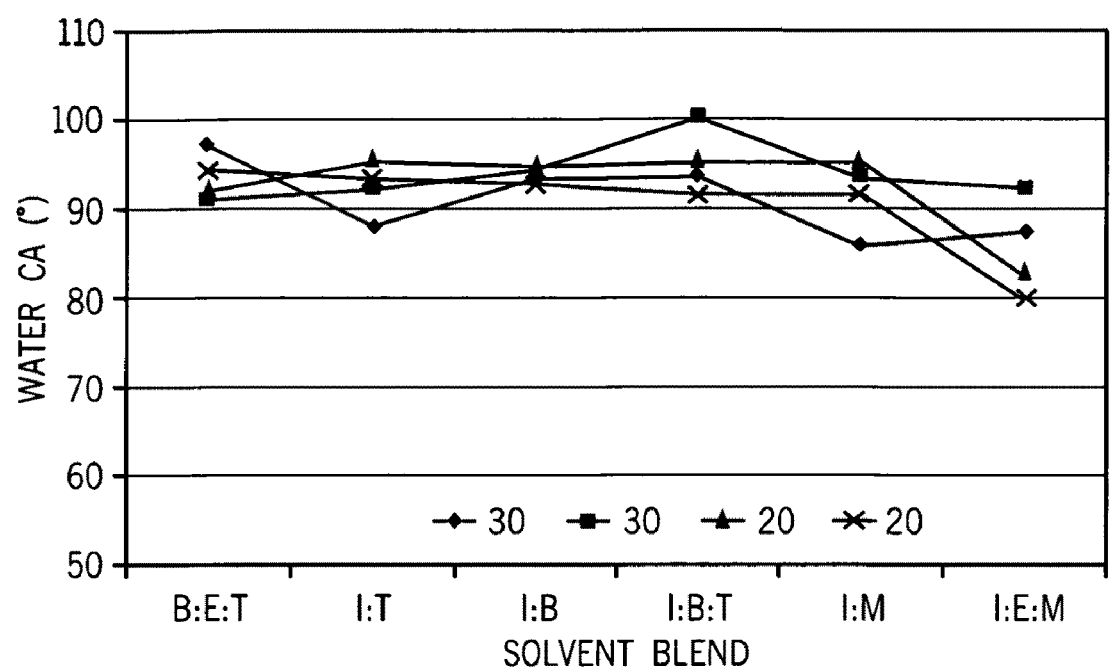
FIG. 7 shows water contact angle data for Library D wherein data series is percent PDMS.

Finally, a library was prepared using two levels of a hydroxyl alkyl terminated PDMS with Desmodur N3600 as the crosslinker and using several different solvent blends. The solvent blends used are described in Table II. The initial water contact angle data is shown in FIG. 7. While most of the coatings were hydrophobic, several coatings were hydrophilic. In particular, most of the coatings based on a blend of IPA, EEP, and MAK were hydrophilic initially.

TABLE II

Solvent Combinations Used in Library D.

| Designation | BA | EEP | Toluene | IPA | BA | MAK |
|---|---|---|---|---|---|---|
| B:E:T | 33.3 | 33.3 | 33.3 | | | |
| I:T | | | | 50 | 50 | |
| I:B | 50 | | 50 | | | |
| I:B:T | 27 | | 4 | 69 | | |
| I:M | | | | 66 | | 34 |
| I:E:M | | 5 | | 68 | | 27 |

Figure 8A:
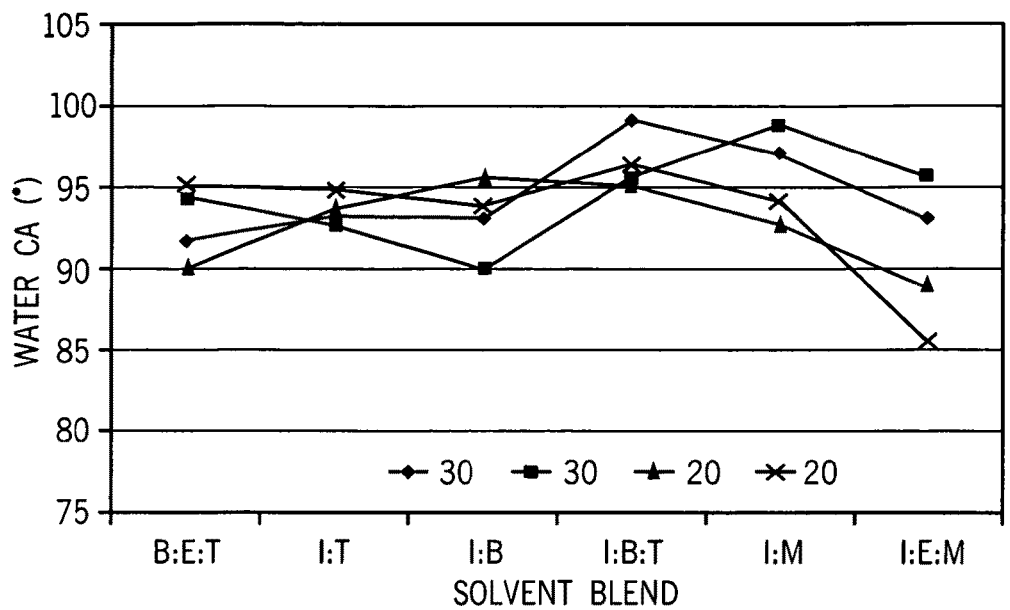
FIG. 8 shows water contact angle and change in water contact angle for Library D after immersion in deionized water for 60 days.
Figure 8B:
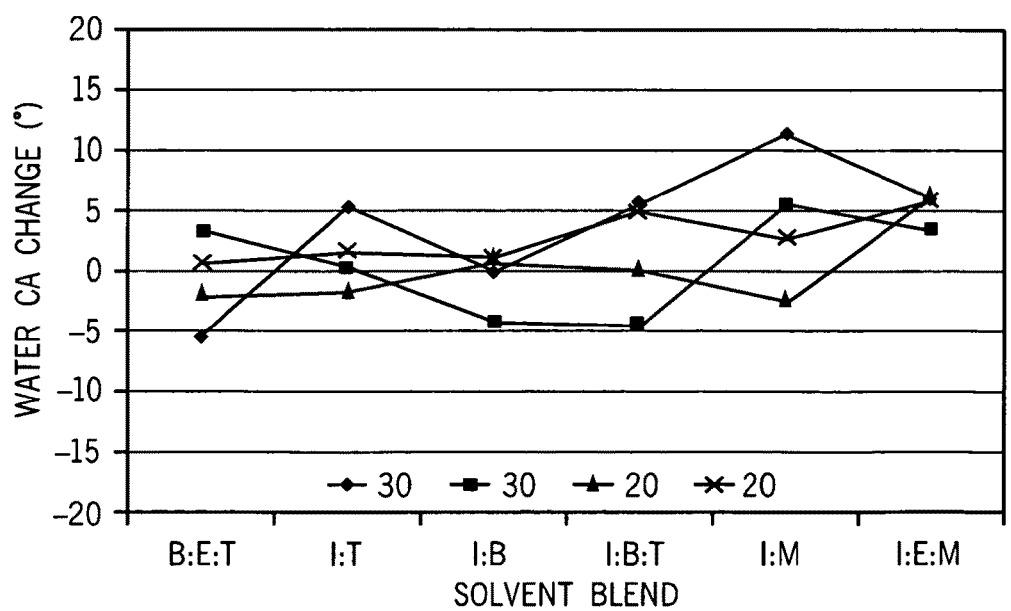

This set of coatings was aged in water for 30 and 60 days and the 60 day water contact angle and change in contact angle data are presented in FIG. 8. The coatings were generally stable with very little change in contact angle following exposure. Several of the coatings had an increase in contact angle, including three coatings that were slightly hydrophilic initially. The coatings based on 20% PDMS and the IPA:EEP:MAK solvent blend had contact angles below 90°. Thus, in this system, a variety of solvents can be used to prepare coatings that are hydrophobic and remain hydrophobic after prolonged exposure to water.

Experimental II

Reagents: Bis(3-aminopropyl)-tetramethyldisiloxane (BAPTMDS) and octamethylcyclotetrasiloxane (D4) were obtained from Gelest Inc. 2,4-Pentanedione, ethyl 3-ethoxypropionate (EEP), dibutyltin diacetate (DBTDAc), tin(II)-2-ethylhexanoate and benzyltrimethylammonium hydroxide (30% solution in methanol) were purchased from Aldrich. Tone Polyol 0305 was received from Dow Chemicals. Tolonate XIDT 70B isocyanate was received from Rhodia. Urethane grade methyl n-amyl ketone (MAK) was received from Eastman. Caprolactone (CL) was received from Solvay Chemicals. All materials were used as received without further purification.

Polymer Synthesis: Synthesis of the functional oligomers was carried out using the Symyx batch reactor system. Scheme 2 shows synthesis of 3-aminopropyl terminated PDMS oligomers and PCL-PDMS-PCL triblock copolymers.

Scheme 2.

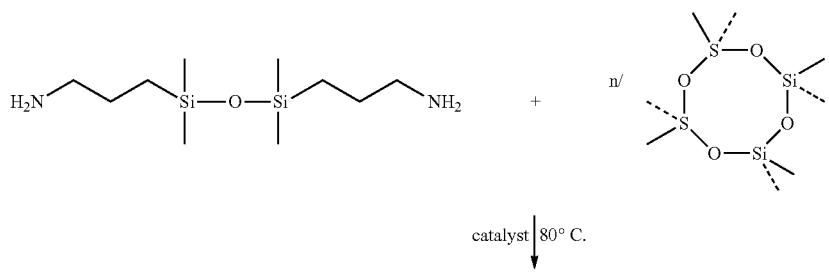

-continued

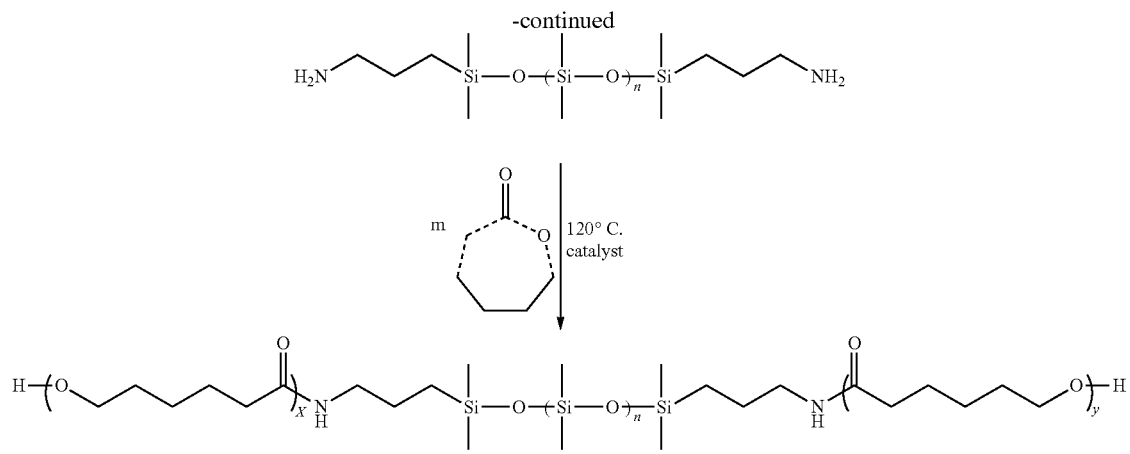

Synthesis of 3-aminopropyl terminated PDMS oligomers was done as follows. 0.1% (by solids) benzyltrimethylammonium hydroxide catalyst was mixed with $D_4$. Since benzyltrimethylammonium hydroxide was received in 30% methanol, methanol was removed under vacuum. The synthesis was mainly accomplished by reacting $D_4$ and BAPTMS in the presence of benzyltrimethylammonium catalyst (Scheme 1). The molecular weights of the oligomers were adjusted by changing the ratio of $D_4$ to BAPTMDS. The reaction was run at 80° C. for 10 hours. After the completion of the reaction, the temperature was increased to 170° C. and kept at that temperature for 1 hour to decompose the catalyst.

Synthesis of polycaprolactone-poly(dimethyl siloxane)-polycaprolactone (PCL-PDMS-PCL) triblock copolymers was done as follows. After completion of the PDMS oligomer synthesis, calculated amount of caprolactone monomer was added to the solutions. One drop of tin(II)-2-ethyl hexanoate catalyst in 10% toluene solution was added to the solutions. The reaction was run at 80° C. for 10 hours, and then the reaction temperature was increased to 120° C. and held for 10 more hours.

Polymer Screening: Molecular weights and molecular weight distribution of the polymers were characterized using the Symyx Rapid GPC™. 1 mg/ml sample solutions in THF were prepared to run GPC. Calibration was done with polystyrene standards. Amine terminated PDMS oligomers were reacted with ethylene carbonate to prevent their interaction with the GPC column.

Coating Formulation: Coating formulations are composed of the PDMS/block copolymer library, Tone Polyol 0305 (polyol), 2,4-pentanedione, DBTDAc catalyst and Tolonate XIDT 70B (isocyanate crosslinker). Stock solutions of 30% siloxane library in EEP, Tone Polyol 0305 in 10% MAK were prepared. A 1% solution of the catalyst DBTDAc was prepared in MAK.

Coating formulations were prepared by adding 10%, 20%, 30% and 40% by weight siloxane polymers into the formulations. The amount of catalyst DBTDAc was adjusted to 0.075% by solids for all coating formulations. The ratio of isocyanate to other functional groups was kept at 1.1:1.0 To all formulations 10% by solids 2,4-pentanedione pot life extender was added.

Using an automated formulation system, the siloxane library, Tone Polyol 0305, and 2,4-pentanedione were added to the vials first and mixed overnight. Then, the isocyanate crosslinker and catalyst were added to the vials and were mixed until sufficient viscosity was achieved for coating application.

Coating Application The coating application was done after all the components were added and the coatings reached the proper application viscosity with the combinatorial coating application system. The formulations were applied to 4" by 8" aluminum panels. After the application, the panels were left at room temperature for overnight curing. Then the panels were placed into the oven for complete curing for 45 minutes at 80° C.

Coating Surface Energy: Contact angles of water and diiodomethane were measured using an automated surface energy system and used to determine the surface energy with Owens-Wendt method. Coating surface energies were measured initially and after 30 days of water immersion.

Automated Pull-Off Adhesion: To determine the adhesive strength of epoxy to a coating surface (adhesion) a Symyx automated pull-off adhesion system was used. Pull-off adhesion of the coatings were measured initially and after 30 days of water immersion.

Results and Discussion

Figure 9B:
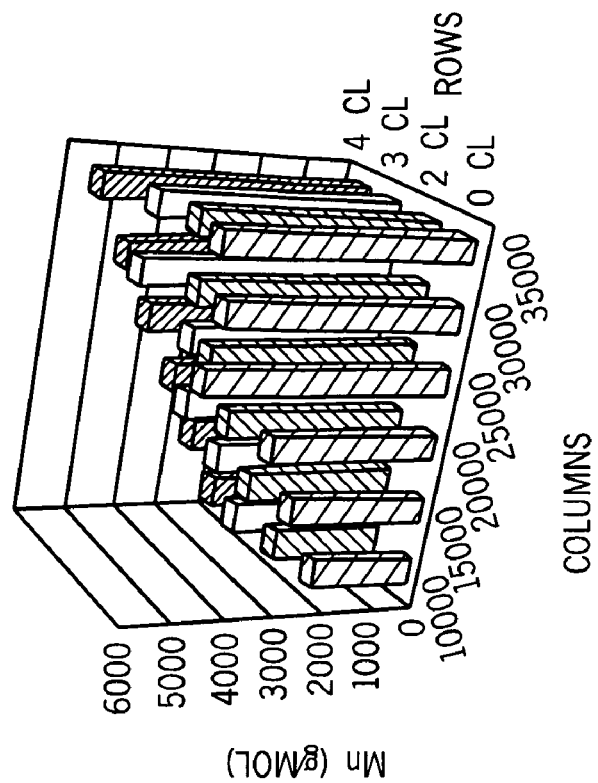
FIG. 9 shows rapid-GPC results of (a) low molecular weight siloxane library and (b) high molecular weight siloxane library.
Figure 9A:
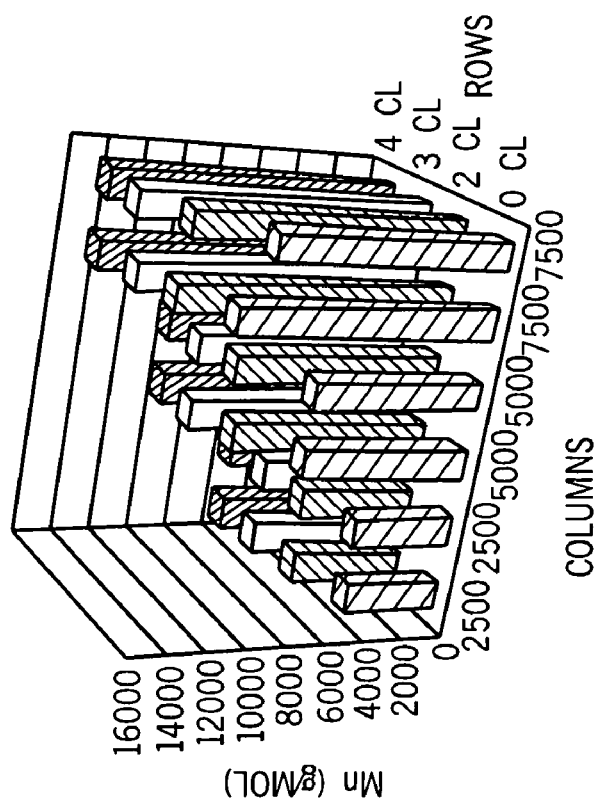

Both low molecular weight and high molecular weight siloxane libraries were characterized by Rapid-GPC for molecular weight determination. Molecular weights of the polymers were intended to increase both column-wise and row-wise for both libraries. The results plotted in FIG. 9 show good agreement with the intended molecular weights of the oligomers.

From the 48 siloxane oligomers synthesized, 192 coatings were formulated with the siloxane oligomers, isocyanate crosslinker, and polyol to form thermoset siloxane urethane coatings. All 192 coatings were uniform and stable under all experimental conditions.

Figure 10:
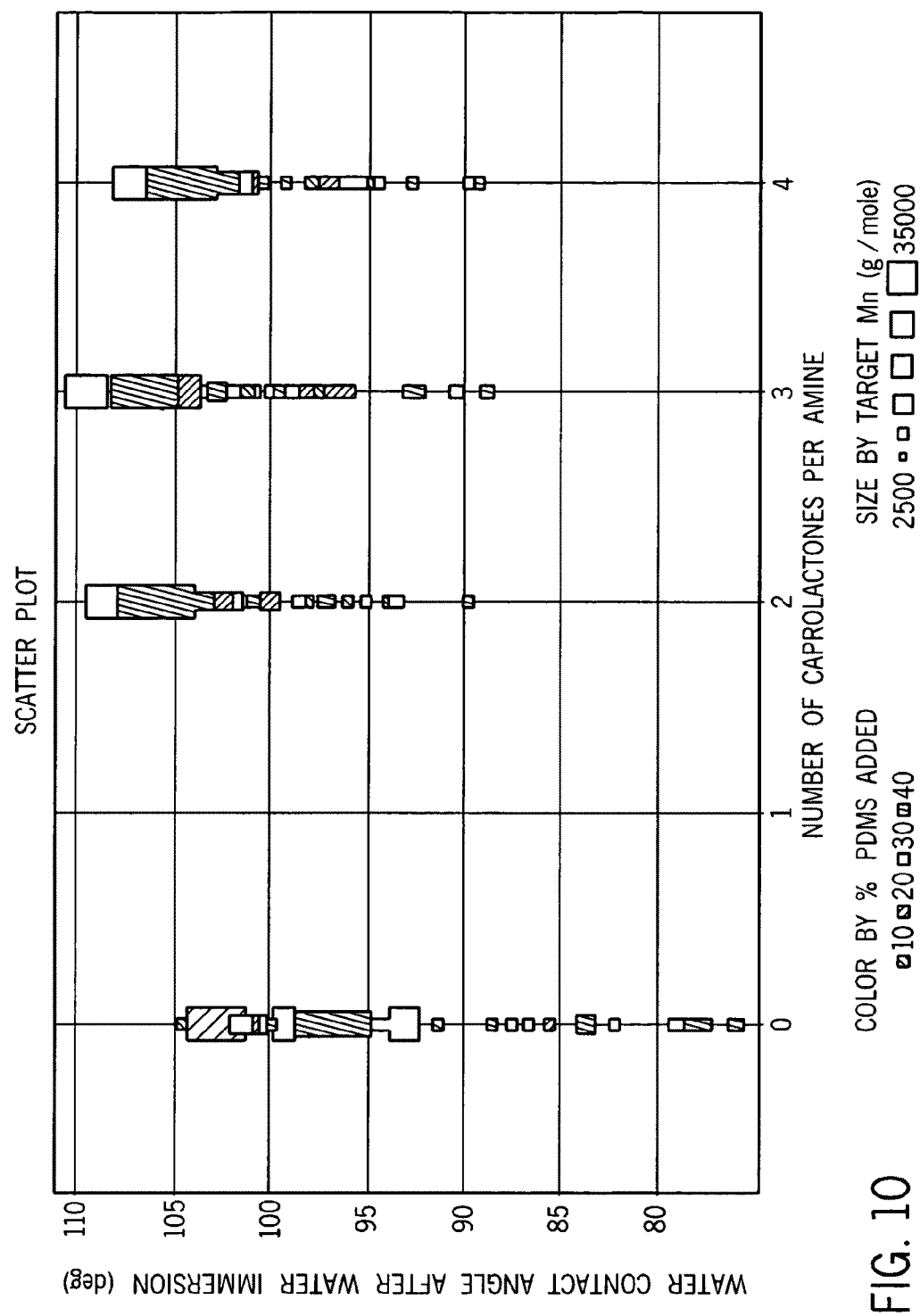
FIG. 10 shows a plot of water contact angle after water immersion vs. number of caprolactones per amine.

As can be seen from FIG. 10, most of the coatings are hydrophobic, indicating that the PDMS predominates on the surface. PCL-PDMS-PCL triblock copolymers have higher water CAs than 3-aminopropyl terminated PDMS oligomers (without PCL blocks). However, it is seen that varying the length of the caprolactone blocks does not significantly affect the water CAs. Interestingly, the PDMS level also does not have a significant effect on the water CAs of the coatings.

Water CAs of the coatings changed after water immersion. Water CAs of most of the coatings either increased (coatings became more hydrophobic) or remained the same and for of some coatings there was a small decrease (became more hydrophilic) following water immersion. Following immersion, the water CAs tended to increase with the molecular weight of the PMDS. This trend was not observed with the initial water CA data of the coatings.

Figure 11:
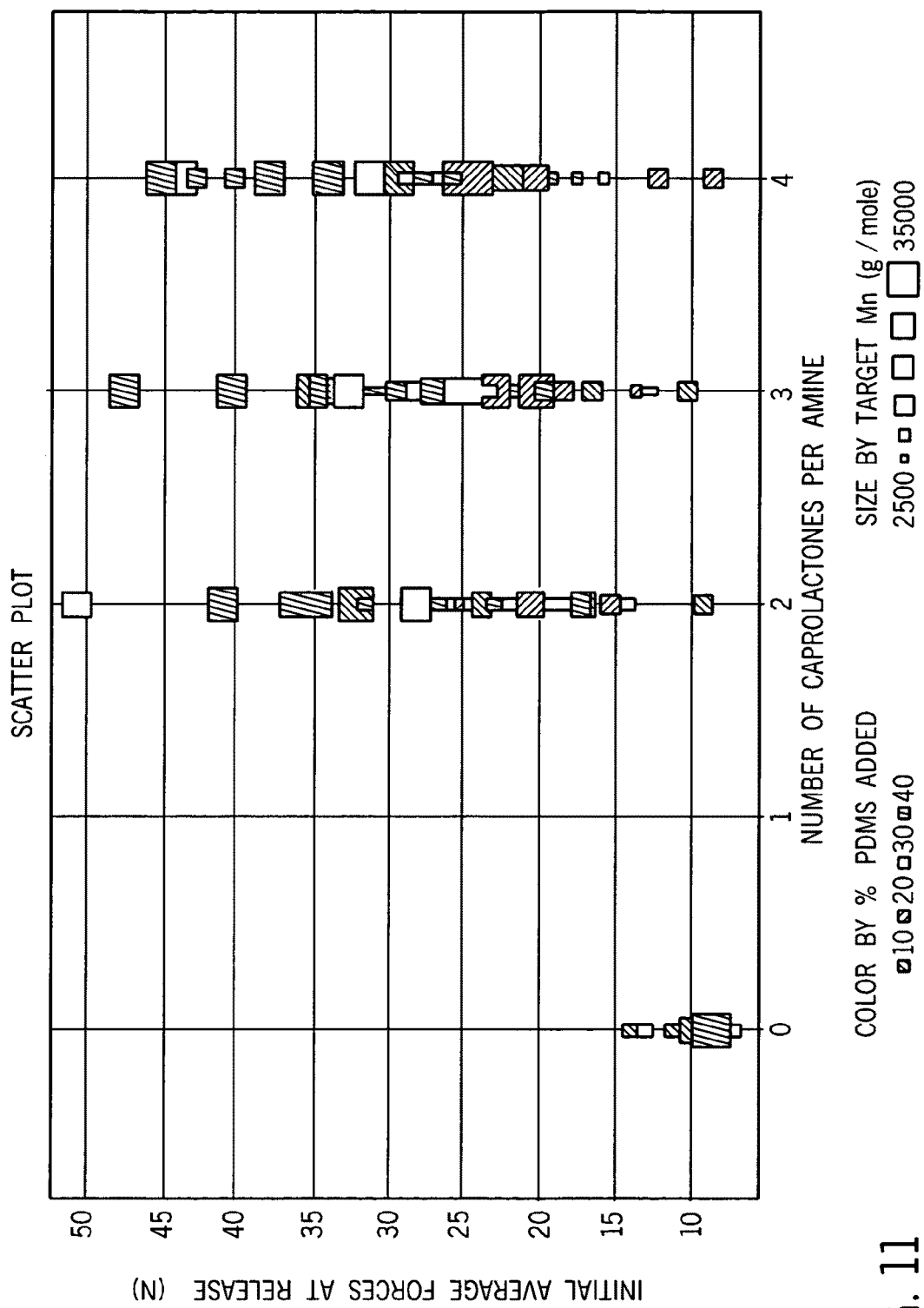
FIG. 11 shows a plot of initial average force at release vs. number of caprolactones per amine.

Average force at release of the coatings (adhesion test) changes abruptly when caprolactone blocks are added to the silicone backbone. This can be seen both initially and after water immersion. As can be seen from FIG. 11, all of the 3-aminopropyl terminated PDMS oligomers have a very low average force at release compared to the PCL-PDMS-PCL triblock copolymers. When PCL-PDMS-PCL triblock copolymers are analyzed among each other, percent PDMS load increases the average force at release slightly.

The average force at release of the coatings changes slightly following water immersion. However, the same general trends that are observed initially are maintained following water immersion.

Experimental III

Reagents. n-Butyl acrylate (BA), inhibited with 10-55 ppm monomethyl ether hydroquinone at 99+% purity, butyl methacrylate (BMA), inhibited with 10 ppm monomethyl ether hydroquinone at 99% purity, and 2-hydroxyethyl acrylate (HEA), inhibited with 200-650 ppm monomethyl ether hydroquinone at 96% purity were obtained from Aldrich (Milwaukee, Wis.). Toluene was obtained from VWR and purified by a solvent purification system. The initiator, 2-azobis (2-methylbutanenitrile) (Vazo 67) was obtained from Dupont (Belle, W. Va.), a 10% solution of Vazo 67 in purified toluene, was prepared for synthesis and used without further purification. Aliphatic polyisocyanate Tolonate HDT 90 was obtained from Rhodia (Cranbury, N.J.). Dibutyltin diacetate (DBTDA) and 2,4-pentanedione were obtained from Aldrich (Milwaukee, Wis.). Polyurethane grade methyl n-amyl ketone (MAK) was supplied by Eastman Chemical (Kingsport, Tenn.). 10,000 MW bis-(3-amino propyl) terminated poly(dimethyl siloxane) was synthesized and used as prepared. A stock solution of 1.0 wt. % DBTDA in MAK was used to prepare formulations. All other reagents were used as received.

Synthesis. In order to provide a range of $T_g$s and crosslink densities, a library of acrylic polyols was designed based on BA, BMA and HEA. A range of hydroxyl equivalent weights were obtained by adjusting the weight percent of HEA from 5 to 20 wt. %. The balance of the formulation consisted of BA, BMA plus four ratios of BA and BMA. All solution polymerizations were carried out in the Symyx batch reactor system housed inside a glove box under dry nitrogen. Acrylate monomers, solvent and initiator were dispensed into 24 vials using a dual-arm liquid robotic pipette. Solutions were mixed with a magnetic stir bar and heated 95° C. for 10 hours. The polymer library was synthesized in a single run to yield 24 acrylic polyols.

Characterization. A TA Instruments Q1000 DSC and Symyx parallel DMTA were used for thermal analysis, Symyx Rapid GPC was used for molecular weight, and Symyx Coating Surface Energy system was used for surface energy analysis. The Symyx pull-off adhesion system was used for the pull-off adhesion analysis.

Coatings Formulation. An automated coating formulation system manufactured by Symyx Discovery Tools, Inc. was used to prepare the formulations. The Symyx coating application system was used to apply formulations to 4×8 inch aluminum and glass substrate panels. A 24-element array of coatings "patches" of 100 μL/sample were applied to the panels using a pipette, then a doctor blade spread the coating into a film. Coatings were cured at 100° C. for one hour.

Results and Discussion

Figure 12:
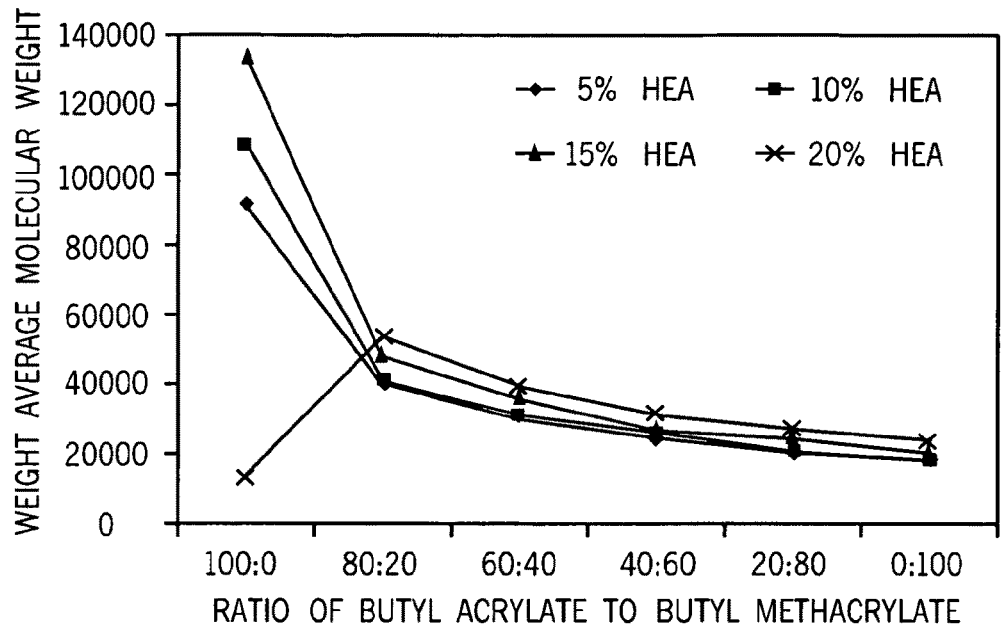
FIG. 12 shows the weight average molecular weight of acrylic polyol library by Rapid GPC.

An acrylic polyol library was synthesized, characterized and formulated into a PDMS-acrylic urethane coating, which was then tested for its mechanical and physical properties. The weight average molecular weight depicted in FIG. 12 shows a decrease in molecular weight as the ratio of n-butyl acrylate (BA) decreases and butyl methacrylate (BMA) increases. This may be due to BA terminating a predominately by combination, whereas BMA terminates predominately by disproportionation.

Figure 13:
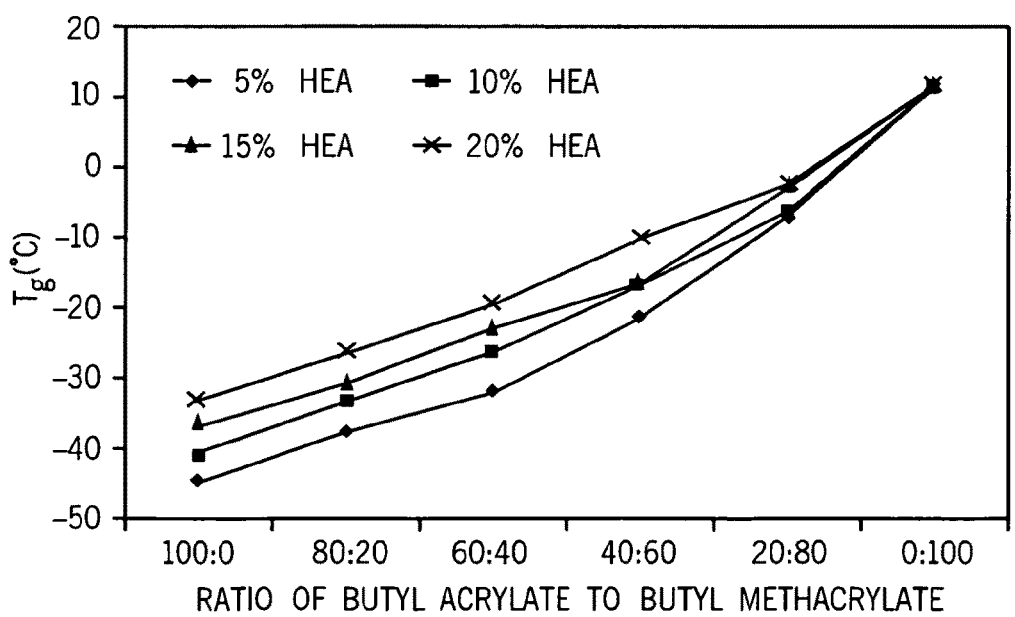
FIG. 13 shows the DSC Experimental Glass Transition Temperatures of acrylic polyol library

FIG. 13 illustrates the $T_g$ of the acrylic polyol library. Once again a trend is seen where, as the ratio of BA to BMA is changed the $T_g$ increases, due to BMA having a much higher $T_g$ than BA, 20° C. to −54° C., respectively. However, at a ratio of 0:100, BA:BMA, there is a convergence of $T_g$ at approximately 10° C. regardless of the level of HEA.

The acrylic polyols were then formulated into polyurethane coatings using HDT 90 and tested for mechanical and physical properties. The glass transition temperatures of the acrylic polyol-urethane, illustrated in FIG. 14, increased as expected due to crosslinking, but still followed the general trend of the acrylic polyol $T_g$s depicted in FIG. 13.

PDMS-acrylic urethane coatings were formulated using 10% bis-(3-amino propyl) terminated Poly (dimethyl siloxane), MW of 10,000. From the water contact angle data depicted in FIG. 16, the siloxane seems to cover the entire surface of the coating due to the high contact angles, were they vary between 95° to 100°. This is possibly due to the self-stratification mechanism were the low surface energy PDMS travel to the surface.

Figure 14:
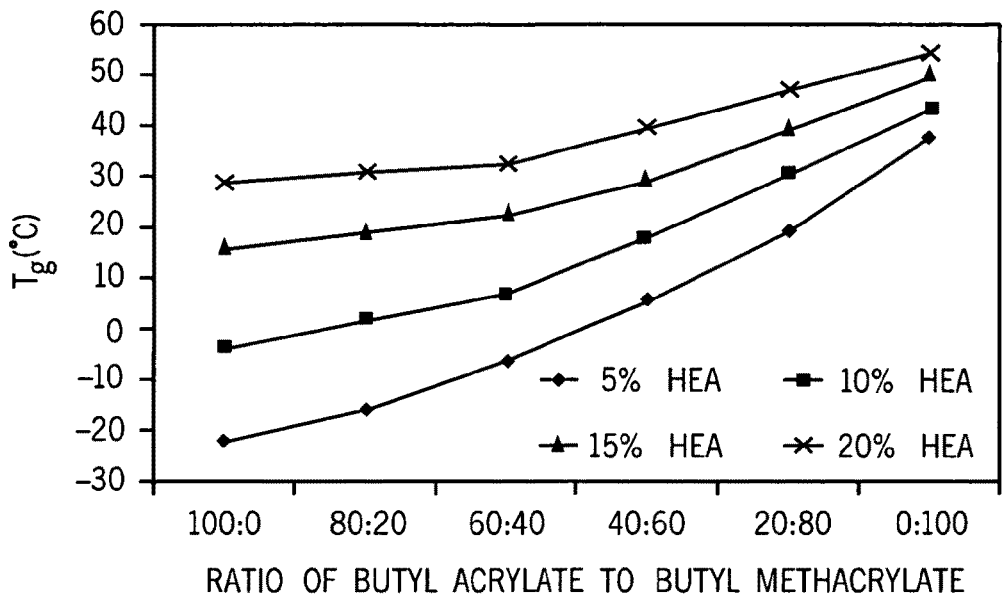
FIG. 14 shows DSC Glass transition temperatures of acrylic polyol-urethane coatings using HDT 90.
Figure 15:
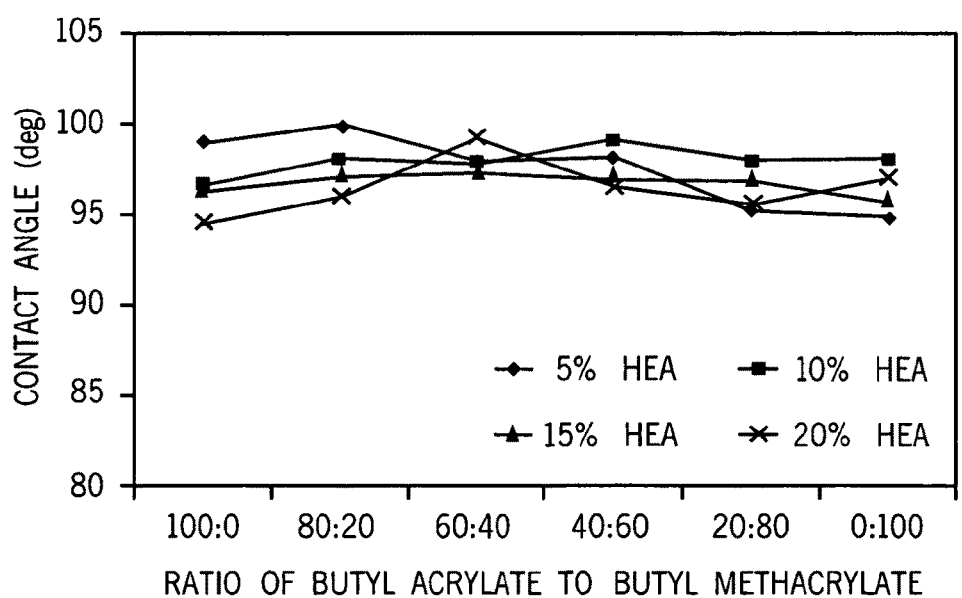
FIG. 15 shows the water contact angle of PDMS-acrylic polyol-urethane coatings.
Figure 16:
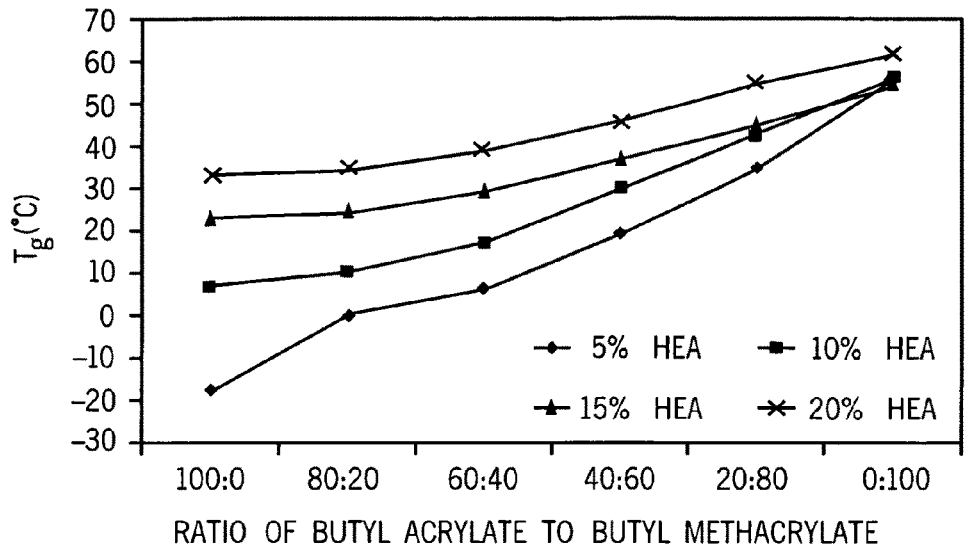
FIG. 16 shows pDMTA Glass transition temperatures of PDMS-acrylic polyol-urethane coatings.
Figure 17:
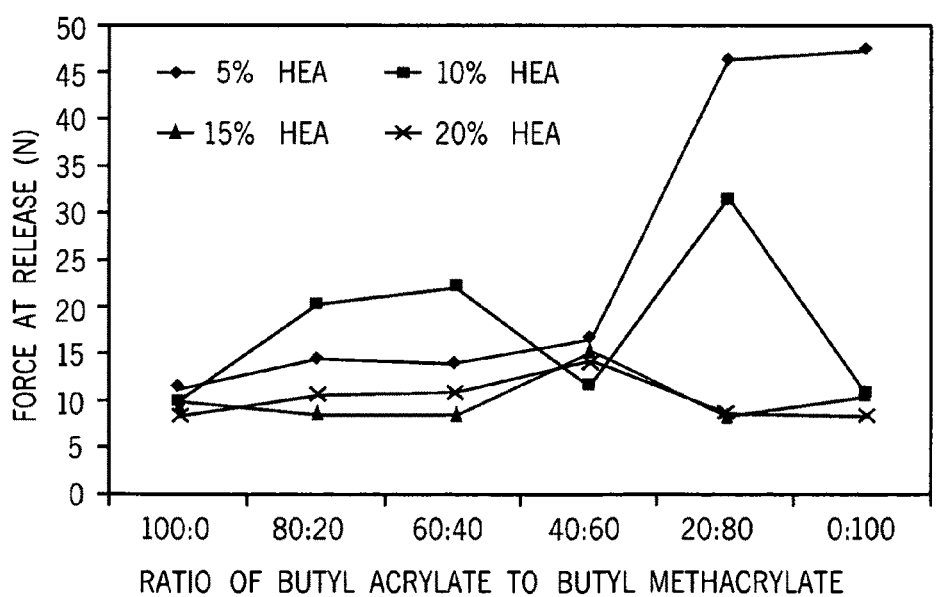
FIG. 17 shows pull-off Adhesion of PDMS-acrylic polyol-urethane coatings.

From the parallel DMTA data depicted in FIG. 16, the $T_g$ of the PDMS-acrylic urethane coatings follows the similar trend of both the acrylic polyol and acrylic-urethane data from FIGS. 13 and 14, respectively. The pull-off adhesion depicted in FIG. 17 shows a low force of release for most of the coatings. An increase in force for the 5% and 10% HEA composition may be due to the increase in polyurethane produced with excess isocyanate not being completely reacted with the lower hydroxyl number for the polyols. The low force of release for the PDMS-acrylic urethane coatings, on average, was better than the commercial PDMS rubber, DC 3140.

Experimental IV

A series of experiments was conducted to assess the effectiveness of PDMS-polyol-urethane coatings formed from polycaprolactone polyols to prevent fouling by algae (Ulva sporelings). The coatings were applied over a Sherwin-Williams primer. Each panel had duplicate patches of two standard silicones (DC 3140 and T2 Silastic, both available from Dow Corning), 4 siloxane polyurethane coatings and 4 siloxane-polycaprolactone-polyurethane coatings. Coatings thickness was between 45 μm to 75 μm.

TABLE III

| Description of the coatings on Array Panels | |
|---|---|
| Paint Patch | Matrix |
| DC 3140 | Control Coating |
| T2 Silastic | Control Coating |

TABLE III-continued

Description of the coatings on Array Panels

| Paint Patch | Matrix |
|---|---|
| PDMS-PU-1 | 20% Siloxane (5,000) Polyurethane |
| PDMS-PU-2 | 20% Siloxane (10,000) Polyurethane |
| PDMS-PU-3 | 20% Siloxane (20,000) Polyurethane |
| PDMS-PU-4 | 20% Siloxane (30,000) Polyurethane |
| PDMS-PCL-PU-1 | 20% Siloxane-polycaprolactone (5,000) Polyurethane |
| PDMS-PCL-PU-2 | 20% Siloxane-polycaprolactone (10,000) Polyurethane |
| PDMS-PCL-PU-3 | 20% Siloxane-polycaprolactone (20,000) Polyurethane |
| PDMS-PCL-PU-4 | 20% Siloxane-polycaprolactone (30,000) Polyurethane |

The numbers in the brackets are the molecular weights of the PDMS segments in the coatings. The 20% is the weight percent of either the PDMS polymer or PDMS-PCL block copolymer in the polyurethane. There is also a polycaprolactone polyol and an isocyanate crosslinker that makes up the balance. Array panels were leached for a total of five weeks prior to the experiment. The panels were equilibrated in artificial seawater for 2 h before the start of the experiment.

Six replicate plates were incubated in trays for 2 h in the dark with a spore inoculum adjusted to 0.1 at absorbance 660 nm. The settled spores were then cultured in enriched seawater medium in a re-circulating culture system. The culture medium was changed after three days. After 6 days, the panels were exposed to the water jet at a series of different impact pressures (32 kPa, 54 kPa, 93 kPa, 132 kPa, 171 kPa and 210 kPa) and the percentage removal estimated.

Biomass growth was good and reasonably uniform on each panel. There was slightly more biomass on the silicone standards than the other coating because the spore settlement density on these patches was higher. There were no signs of primer toxicity on this set of panels.

Figure 22B:
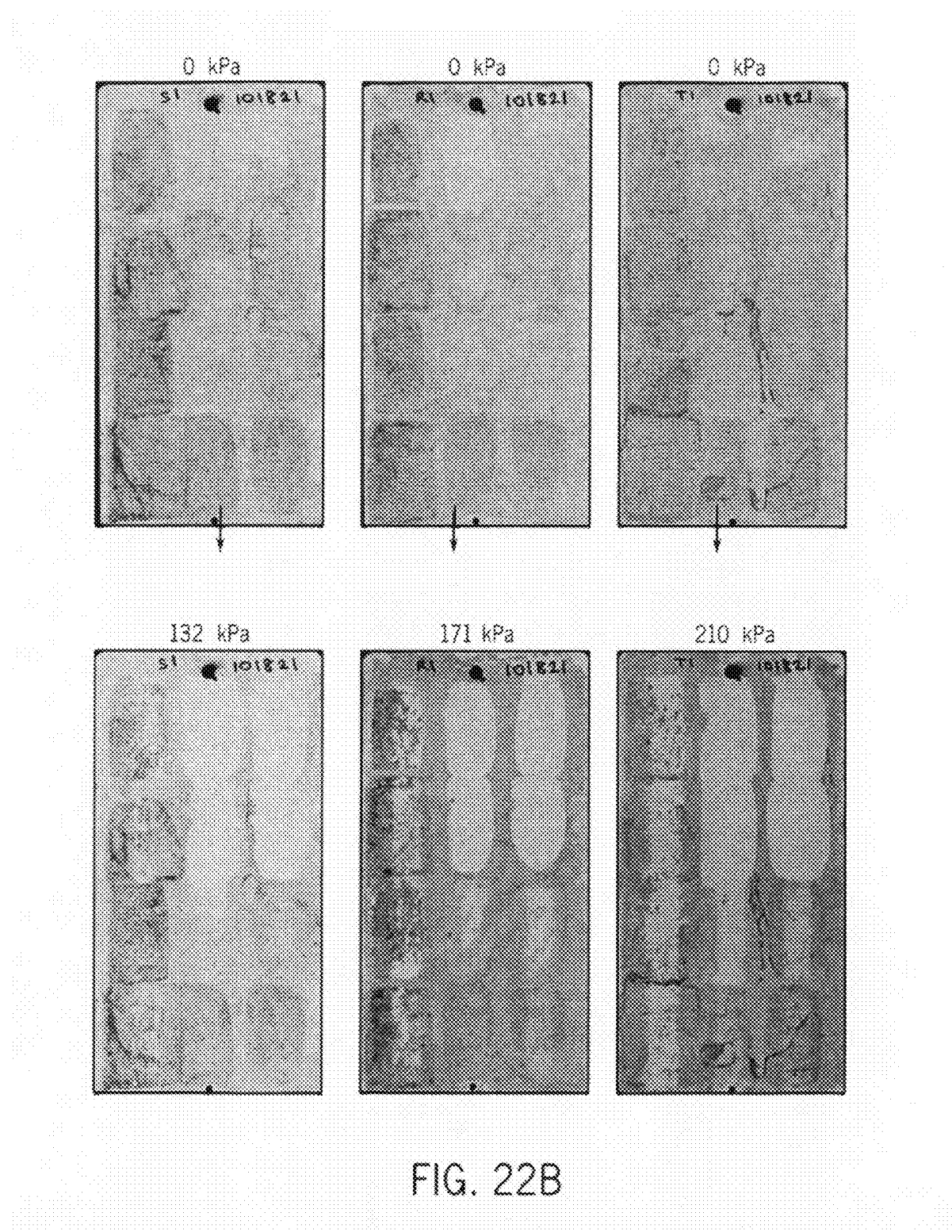
FIG. 22 shows panels (P, O, K, S, R and T) before and after being sprayed at different impact pressure with the water jet.
Figure 23:
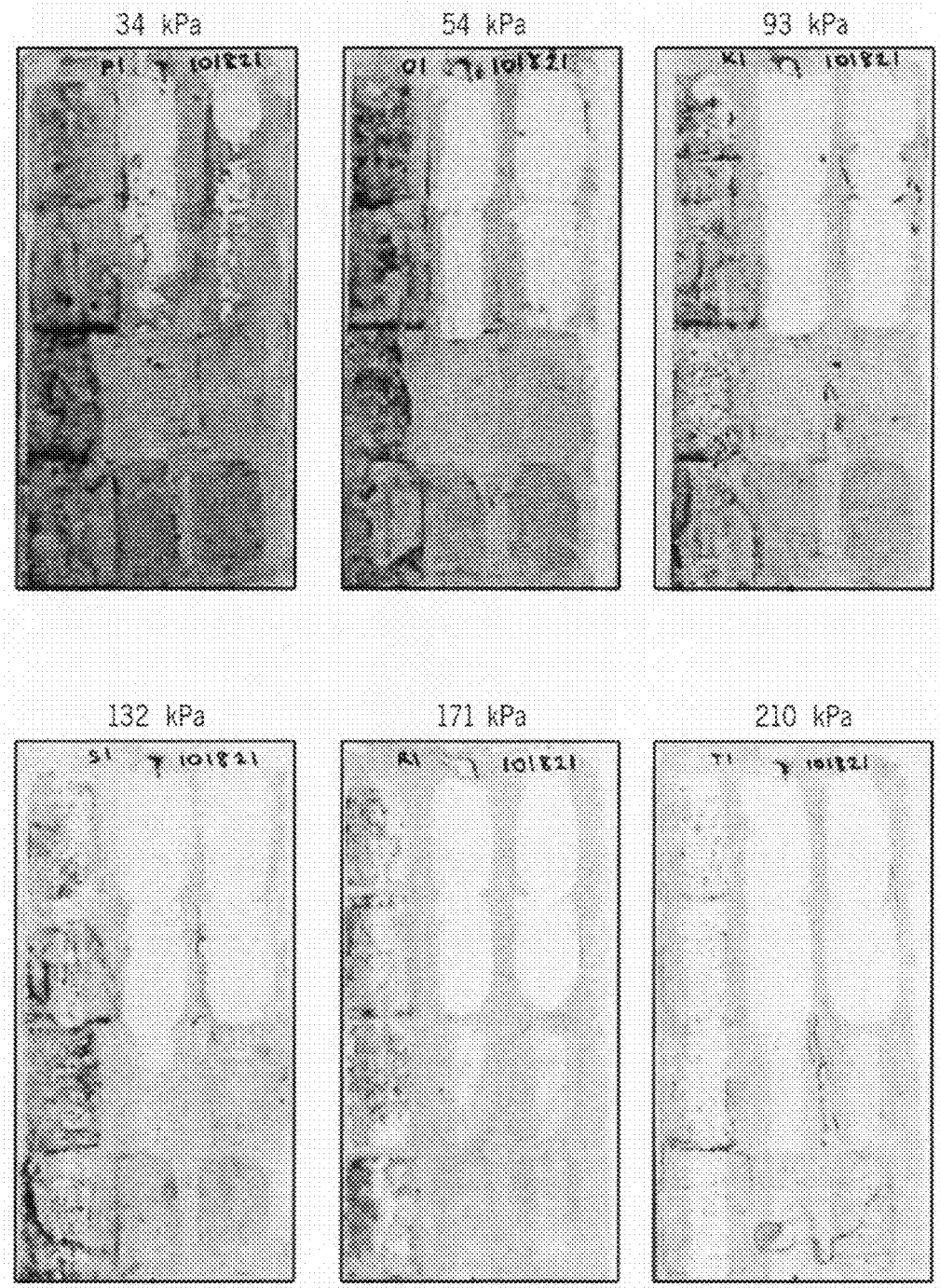
FIG. 23 shows from the left to the right panels (P, O, K, S, R and T) after being sprayed at 34 kPa, 54 kPa, 93 kPa, 132 kPa, 171 kPa and 210 kPa of impact pressure with the water jet.

Biomass removal evaluated visually is presented FIG. 22. The standards DC3140 and T2 show similar performance but the removal was poor with only around 50% removal at 171 kPa of impact pressure. As noted previously, the standards appeared to be very thin coatings, which may contribute to the poor release properties. Removal of biomass from the PDMS-PU coatings was much higher than from the standards. The formulations based on PDMS-PCL-PU showed the same or lower release performance than the DC3140 and T2 standards.

Figure 18:
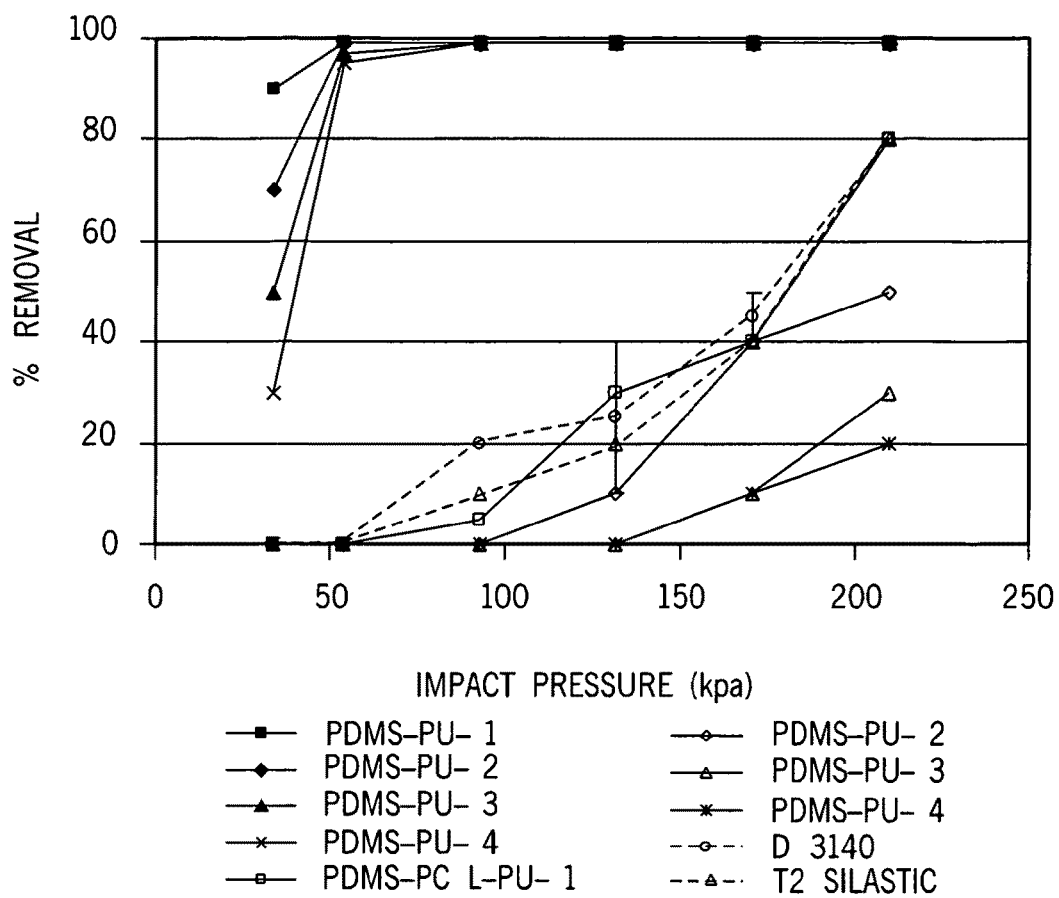
FIG. 18 shows percentage removal of Ulva sporelings from test patches at different impact pressure using the water jet wherein the mean of the two standard patches is plotted; and the error bars show the scores for the two replicate patches of DC3140 and T2 on each panel.
Figure 19:
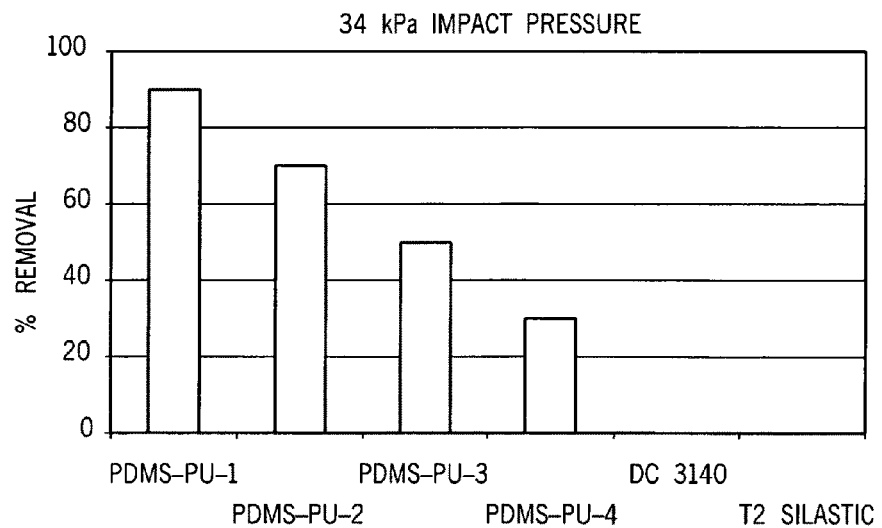
FIG. 19 shows percentage removal from PDMS-PU paint patches and silicone standards at 34 kPa of impact pressure using the water jet.

The highest discrimination between the PDMS-PU coatings was obtained at 34 kPa of impact pressure and the data are presented in FIGS. 18 and 19. PDMS-PU-1 shows 90% removal at the lowest pressure and PDMS-PU-4 only 30% removal. The release performance of the coatings decreased when the molecular weight of the siloxane in the coating was increased.

Figure 20:
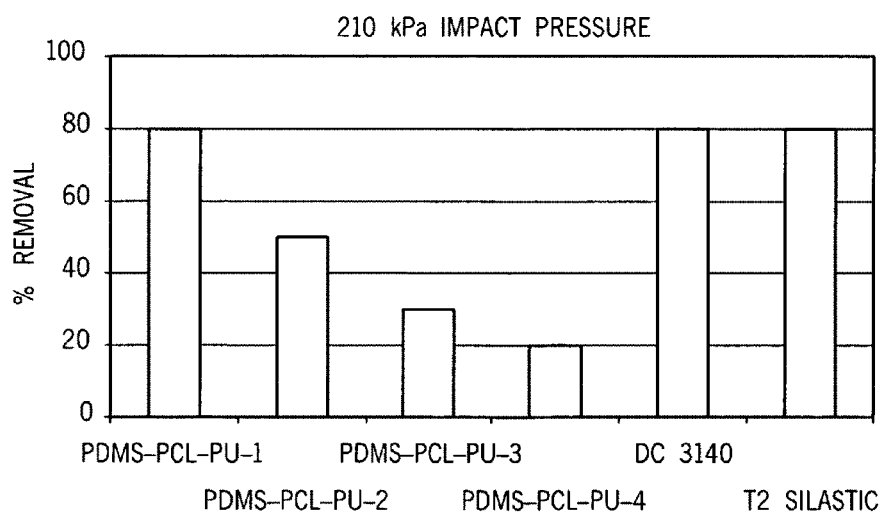
FIG. 20 shows percentage removal from PDMS-PCL-PU paint patches and silicone standards at 210 kPa of impact pressure using the water jet.

The data obtained at the highest pressure tested (210 kPa) for the PDMS-PCL-PU coatings are presented in FIGS. 18 and 20. PDMS-PCL-PU-1 shows similar performance to the silicone standards. The other coatings show less removal than the standards and PDMS-PU-4 shows the worst performance of all the coatings. It seems the addition of polycaprolactone considerably reduces the release of biomass. As observed in the 2005 sample set, the fouling release performance is highest for the coatings with the lowest molecular weight of siloxane in the formulations.

TABLE IV

Percentage removal at different impact pressure using the water jet

| | % removal of biomass at different impact pressures | | | | | |
|---|---|---|---|---|---|---|
| Paint Patch | 34 kPa P | 54 kPa O | 93 kPa K | 132 kPa S | 171 kPa R | 210 kPa T |
| DC 3140 | 0 | 0 | 20 | 40:10 | 50:40 | 80 |
| T2 Silastic | 0 | 0 | 10 | 20 | 40 | 80 |
| PDMS-PU-1 | 90 | 99 | 99 | 99 | 99 | 99 |
| PDMS-PU-2 | 70 | 99 | 99 | 99 | 99 | 99 |
| PDMS-PU-3 | 50 | 97 | 99 | 99 | 99 | 99 |
| PDMS-PU-4 | 30 | 95 | 99 | 99 | 99 | 99 |
| PDMS-PCL-PU-1 | 0 | 0 | 5 | 30 | 40 | 80 |
| PDMS-PCL-PU-2 | 0 | 0 | 0 | 10 | 40 | 50 |
| PDMS-PCL-PU-3 | 0 | 0 | 0 | 0 | 10 | 30 |
| PDMS-PCL-PU-4 | 0 | 0 | 0 | 0 | 10 | 20 |

Replicate panels are P, O, K, S, R and T. The two values for the standards are the scores for the two replicate patches on each panel.

Experimental V

Fouling Release Properties of Siloxane Acrylic Polyurethane Coatings on Array Panels, Growth & Release of Ulva Sporelings on Panels after an Extended Period of Leaching A series of experiments was conducted to assess the effectiveness of PDMS-polyol-urethane coatings formed from polycaprolactone polyols to prevent fouling by algae (Ulva sporelings).
1. Coating contained different ratios of 2-Hydroxy Ethyl Acrylate (HEA), Butyl Acrylate (BA) and Butyl Methacrylate (BM) in the acrylic urethane component of silicone/urethane compositions.
2. Some of the experimental coatings showed higher release of Ulva sporelings than the silicone standards.
3. Highest biomass removal was associated with PDSM-PU-7 (HEA:BA:BM=20:80:0) with 60% removal at 54 kPa.
4. Coatings with a high percentage of HEA showed the greatest removal.
5. Coatings with a high ratio of BA:BM gave the best removal.

Samples

One set of array panels comprised three aluminium panels with coating patches applied over a Sherwin-Williams primer. There are 24 different acrylic polyol compositions formulated into Siloxane-Acrylic Polyurethane coatings presented in Tables V through IX. In Table V, 10,000 is the molecular weight of the PDMS segment in the coating and 10% the weight percent of the PDMS polymer. Other numbers in the brackets with HEA, BA and BM respectively indicate the percentage of 2-Hydroxy Ethyl Acrylate, Butyl Acrylate and Butyl Methacrylate within the Acrylic polyol composition. Table VI shows disposition of the coatings on the array panels. Tables VII through IX show 24 different acrylic polyol compositions formulated into siloxane-acrylic polyurethane coatings. Differences between the coatings reflect the acrylic polyol composition. Three compounds modified the composition, 2-Hydroxy Ethyl Acrylate (HEA), Butyl Acrylate (BA) and Butyl Methacrylate (BM). Each panel had 4 patches of standard silicones (2×DC3140 and 2×T2 Silastic); coating thickness was between 45 μm to 75 μm.

TABLE V

Description Of The Coatings On Array Panels

| Code | Description |
|---|---|
| DC 3140 | Control Coating |
| T2 Silastic | Control Coating |
| PDMS-PU-1 | 10% Siloxane (10,000), Acrylic Polyurethane (HEA:BA:BM = 5:95:0) |
| PDMS-PU-2 | 10% Siloxane (10,000), Acrylic Polyurethane (HEA:BA:BM = 5:76:19) |
| PDMS-PU-3 | 10% Siloxane (10,000), Acrylic Polyurethane (HEA:BA:BM = 10:90:0) |
| PDMS-PU-4 | 10% Siloxane (10,000), Acrylic Polyurethane (HEA:BA:BM = 10:72:18) |
| PDMS-PU-5 | 10% Siloxane (10,000), Acrylic Polyurethane (HEA:BA:BM = 15:85:0) |
| PDMS-PU-6 | 10% Siloxane (10,000), Acrylic Polyurethane (HEA:BA:BM = 15:68:17) |
| PDMS-PU-7 | 10% Siloxane (10,000), Acrylic Polyurethane (HEA:BA:BM = 20:80:0) |
| PDMS-PU-8 | 10% Siloxane (10,000), Acrylic Polyurethane (HEA:BA:BM = 20:64:16) |
| PDMS-PU-9 | 10% Siloxane (10,000), Acrylic Polyurethane (HEA:BA:BM = 5:57:38) |
| PDMS-PU-10 | 10% Siloxane (10,000), Acrylic Polyurethane (HEA:BA:BM = 5:38:57) |
| PDMS-PU-11 | 10% Siloxane (10,000), Acrylic Polyurethane (HEA:BA:BM = 10:54:36) |
| PDMS-PU-12 | 10% Siloxane (10,000), Acrylic Polyurethane (HEA:BA:BM = 10:36:54) |
| PDMS-PU-13 | 10% Siloxane (10,000), Acrylic Polyurethane (HEA:BA:BM = 15:51:34) |
| PDMS-PU-14 | 10% Siloxane (10,000), Acrylic Polyurethane (HEA:BA:BM = 15:34:51) |
| PDMS-PU-15 | 10% Siloxane (10,000), Acrylic Polyurethane (HEA:BA:BM = 20:48:32) |
| PDMS-PU-16 | 10% Siloxane (10,000), Acrylic Polyurethane (HEA:BA:BM = 20:32:48) |
| PDMS-PU-17 | 10% Siloxane (10,000), Acrylic Polyurethane (HEA:BA:BM = 5:19:76) |
| PDMS-PU-18 | 10% Siloxane (10,000), Acrylic Polyurethane (HEA:BA:BM = 5:0:95) |
| PDMS-PU-19 | 10% Siloxane (10,000), Acrylic Polyurethane (HEA:BA:BM = 10:18:72) |
| PDMS-PU-20 | 10% Siloxane (10,000), Acrylic Polyurethane (HEA:BA:BM = 10:0:90) |
| PDMS-PU-21 | 10% Siloxane (10,000), Acrylic Polyurethane (HEA:BA:BM = 15:17:68) |
| PDMS-PU-22 | 10% Siloxane (10,000), Acrylic Polyurethane (HEA:BA:BM = 15:0:85) |
| PDMS-PU-23 | 10% Siloxane (10,000), Acrylic Polyurethane (HEA:BA:BM = 20:16:64) |
| PDMS-PU-24 | 10% Siloxane (10,000), Acrylic Polyurethane (HEA:BA:BM = 20:0:80) |

TABLE VII

2-Hydroxy Ethyl Acrylate (HEA)

| | Panel 1 | | Panel 2 | | Panel 3 | |
|---|---|---|---|---|---|---|
| | 1 | 2 | 3 | 4 | 5 | 6 |
| A | 5 | 5 | 5 | 5 | 5 | 5 |
| B | 10 | 10 | 10 | 10 | 10 | 10 |
| C | 15 | 15 | 15 | 15 | 15 | 15 |
| D | 20 | 20 | 20 | 20 | 20 | 20 |

TABLE VIII

Butyl Acrylate (BA)

| | Panel 1 | | Panel 2 | | Panel 3 | |
|---|---|---|---|---|---|---|
| | 1 | 2 | 3 | 4 | 5 | 6 |
| A | 95 | 76 | 57 | 38 | 19 | 0 |
| B | 90 | 72 | 54 | 36 | 18 | 0 |
| C | 85 | 68 | 51 | 34 | 17 | 0 |
| D | 80 | 64 | 48 | 32 | 16 | 0 |

TABLE IX

Butyl Methacrylate (BM)

| | Panel 1 | | Panel 2 | | Panel 3 | |
|---|---|---|---|---|---|---|
| | 1 | 2 | 3 | 4 | 5 | 6 |
| A | 0 | 19 | 38 | 57 | 76 | 95 |
| B | 0 | 18 | 36 | 54 | 72 | 90 |
| C | 0 | 17 | 34 | 51 | 68 | 85 |
| D | 0 | 16 | 32 | 48 | 64 | 80 |

TABLE VI

Disposition of the Coatings on the Array Panels

| Panel 1 | | | Panel 2 | | | Panel 3 | | |
|---|---|---|---|---|---|---|---|---|
| DC 3140 | PDMS-PU-1 HEA:BA:BM 5:95:0 | PDMS-PU-2 HEA:BA:BM 5:76:19 | DC 3140 | PDMS-PU-9 HEA:BA:BM 5:57:38 | PDMS-PU-10 HEA:BA:BM 5:38:57 | DC 3140 | PDMS-PU-17 HEA:BA:BM 5:19:76 | PDMS-PU-18 HEA:BA:BM 5:0:95 |
| T2 Silastic | PDMS-PU-3 HEA:BA:BM 10:90:0 | PDMS-PU-4 HEA:BA:BM 10:72:18 | T2 Silastic | PDMS-PU-11 HEA:BA:BM 10:54:36 | PDMS-PU-12 HEA:BA:8M 10:36:54 | T2 Silastic | PDMS-PU-19 HEA:BA:BM 10:18:72 | PDMS-PU-20 HEA:BA:BM 10:0:90 |
| DC 3140 | PDMS-PU-5 HEA:BA:BM 15:85:0 | PDMS-PU-6 HEA:BA:BM 15:68:17 | DC 3140 | PDMS-PU-13 HEA:BA:BM 15:51:34 | PDMS-PU-14 HEA:BA:BM 15:34:51 | DC 3140 | PDMS-PU-21 HEA:BA:BM 15:17:68 | PDMS-PU-22 HEA:BA:BM 15:0:85 |
| T2 Silastic | PDMS-PU-7 HEA:BA:BM 20:80:0 | PDMS-PU-8 HEA:BA:BM 20:64:16 | T2 Silastic | PDMS-PU-15 HEA:BA:BM 20:48:32 | PDMS-PU-16 HEA:BA:BM 20:32:48 | T2 Silastic | PDMS-PU-23 HEA:BA:BM 20:16:64 | PDMS-PU-24 HEA:BA:BM 20:0:80 |

TABLE X

Six Different Ratios Tested from BA and BM.
Ratio of Butyl Acrylate to Butyl Methacrylate (BA:BM)

|   | Panel 1 | | Panel 2 | | Panel 3 | |
|---|---|---|---|---|---|---|
|   | 1 | 2 | 3 | 4 | 5 | 6 |
| A | 100:0 | 80:20 | 60:40 | 40:60 | 20:80 | 0:100 |
| B | 100:0 | 80:20 | 60:40 | 40:60 | 20:80 | 0:100 |
| C | 100:0 | 80:20 | 60:40 | 40:60 | 20:80 | 0:100 |
| D | 100:0 | 80:20 | 60:40 | 40:60 | 20:80 | 0:100 |

TABLE XI

Four Different Hydroxyl Equivalent Weights Tested from HEA, BA, and BM.
Hydroxyl Equivalent Weight

|   | Panel 1 | | Panel 2 | | Panel 3 | |
|---|---|---|---|---|---|---|
|   | 1 | 2 | 3 | 4 | 5 | 6 |
| A | 2324 | 2324 | 2324 | 2324 | 2324 | 2324 |
| B | 1162 | 1162 | 1162 | 1162 | 1162 | 1162 |
| C | 775 | 775 | 775 | 775 | 775 | 775 |
| D | 581 | 581 | 581 | 581 | 581 | 581 |

Methods

Array panels were leached for a total of twelve weeks prior to the experiment on the 25 Oct. 2005. The water in the tanks was changed weekly and the panels were gently washed with a sponge under running water 2 days before the experiment. The panels were equilibrated in artificial seawater for 2 h before the start of the experiment.

Note: the primer on panels leached out for a total of 8 weeks was toxic to Ulva spores/sporelings, hence the necessity for a protracted period of leaching. Also see the note at the end of this report.

The methods used for the Ulva sporelings assay were the same as described previously. Three replicate sets of plates (i.e. 9 plates in total), were incubated in trays for 3 h in the dark with a spore inoculum adjusted to 0.1 at absorbance 660 nm. After gentle washing, the settled spores were cultured in enriched seawater medium in a re-circulating culture system. The position of the plates was changed and they were rotated around the tanks every 2 days so that all panels were exposed to the same conditions. After 7 days, the plates were exposed to the water jet at a series of different impact pressures. Plate B (B1, B2, B3), A (A1, A2, 13) and D (D1, D2, D3) were hosed at 93 kPa, 151 kPa and 210 kPa, respectively. However, A1, was firstly hosed at a low pressure (54 kPa), and then subsequently subjected to 151 kPa impact pressure. Percentage removal was estimated by eye. Photographs were taken of all panels before and after hosing. Table XII shows the percentage removal from panels (B1, B2, B3; A1, A2, A3; D1, D2, D3) at 54 kPa, 93 kPa, 151 kPa and 210 kPa of impact pressure using the water jet.

TABLE XII

% removal of biomass at 54 kPa of impact pressure

|   | Panel A1 | | Panel 2 | | Panel 3 | |
|---|---|---|---|---|---|---|
|   | 1 | 2 | 3 | 4 | 5 | 6 |
| A | 0 | 0 | — | — | — | — |
| B | 0 | 0 | — | — | — | — |
| C | 0 | 5 | — | — | — | — |
| D | 60 | 20 | — | — | — | — |

% removal of biomass at 93 kPa of impact pressure

|   | Panel B1 | | Panel B2 | | Panel B3 | |
|---|---|---|---|---|---|---|
|   | 1 | 2 | 3 | 4 | 5 | 6 |
| A | 10 | 5 | 0 | 0 | 10 | 30 |
| B | 30 | 30 | 10 | 10 | 10 | 30 |
| C | 60 | 50 | 10 | 30 | 10 | 30 |
| D | 99 | 60 | 50 | 50 | 40 | 30 |

|   | Panel A1 | | Panel A2 | | Panel A3 | |
|---|---|---|---|---|---|---|
|   | 1 | 2 | 3 | 4 | 5 | 6 |
| A | 20 | 10 | 5 | 20 | 20 | 30 |
| B | 10 | 10 | 20 | 20 | 20 | 40 |
| C | 40 | 50 | 30 | 40 | 30 | 50 |
| D | 99 | 70 | 90 | 80 | 95 | 50 |

% removal of biomass at 210 kPa of impact pressure

|   | Panel D1 | | Panel D2 | | Panel D3 | |
|---|---|---|---|---|---|---|
|   | 1 | 2 | 3 | 4 | 5 | 6 |
| A | 60 | 30 | 10 | 40 | 30 | 50 |
| B | 70 | 80 | 40 | 40 | 20 | 50 |
| C | 95 | 95 | 40 | 50 | 30 | 60 |
| D | 99 | 70 | 90 | 80 | 90 | 40 |

Results & Discussion

Sporeling Growth

None of the panels showed any signs of primer toxicity. Growth of biomass was good and uniform over the array panels except on PDMS-PU-18 and PDMS-PU-20 on panel A3 and D3 where the accumulation of air bubbles on the surface affected sporeling growth and removal.

Sporeling Removal

Figure 28:
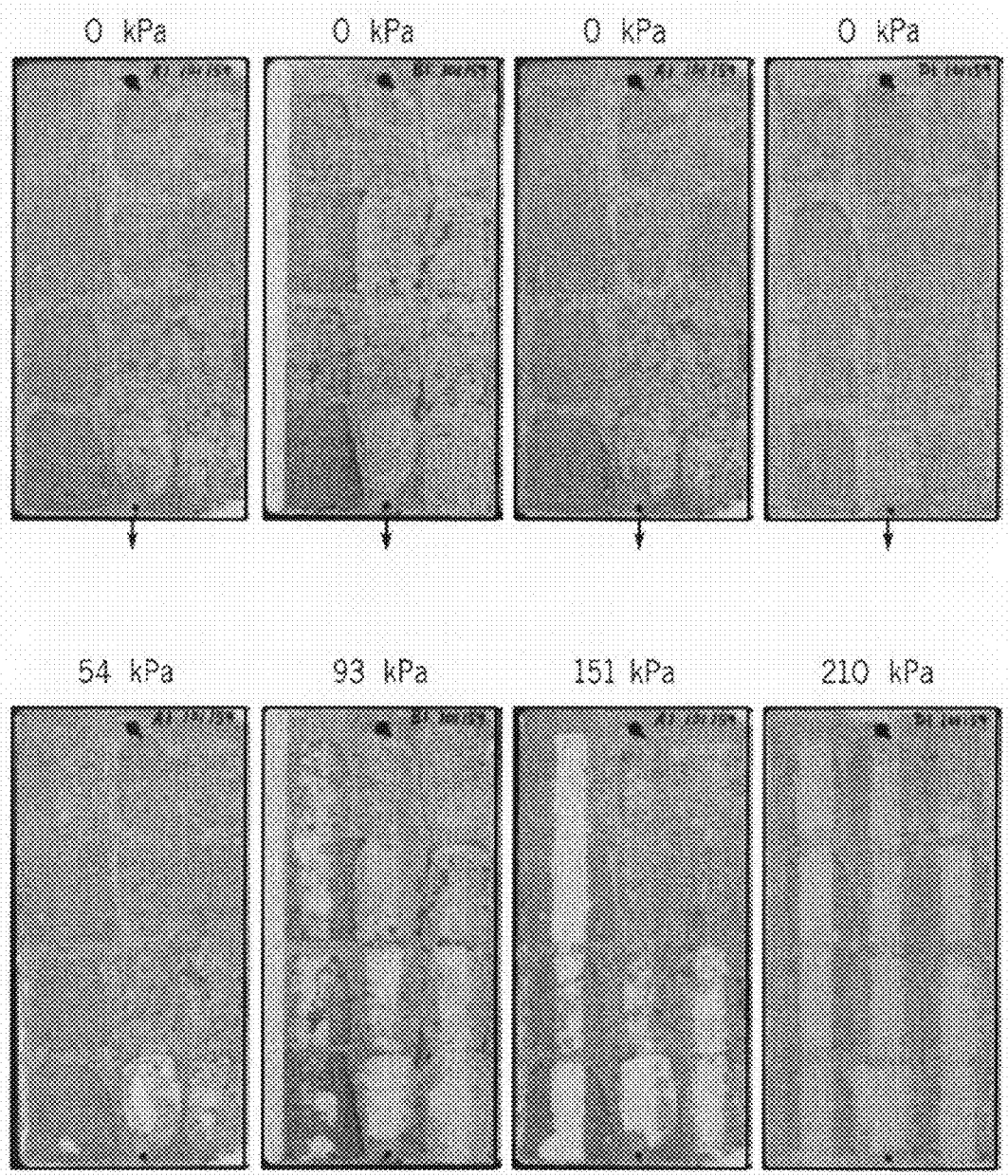
FIG. 28 shows panel 1 (B1, A1 and D1) before and after being sprayed at different impact pressure with the water jet; A1 was sprayed at 54 kPa, then 151 kPa.
Figure 29:
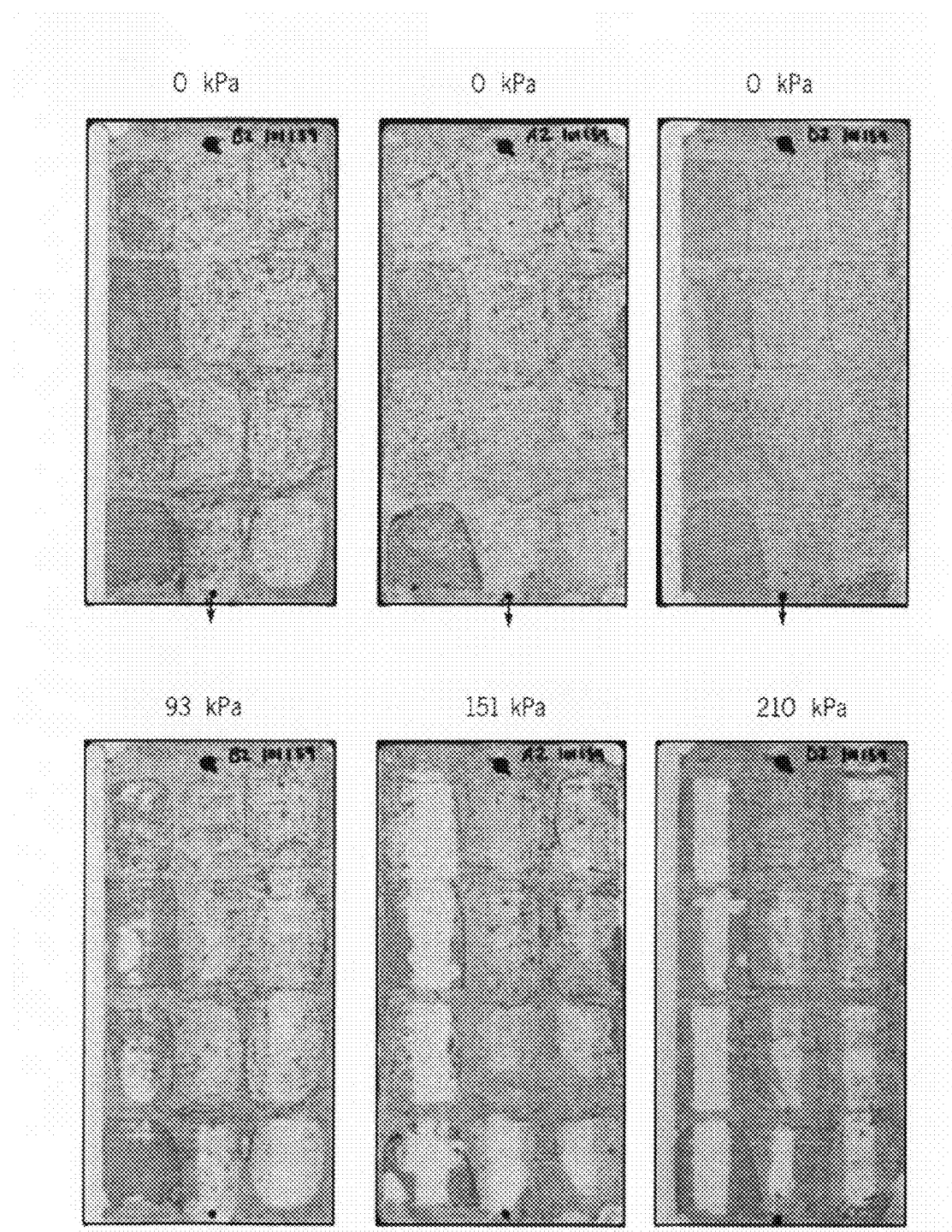
FIG. 29 shows panel 2 (B2, A2 and D2) before and after being sprayed at different impact pressure with the water jet.
Figure 30:
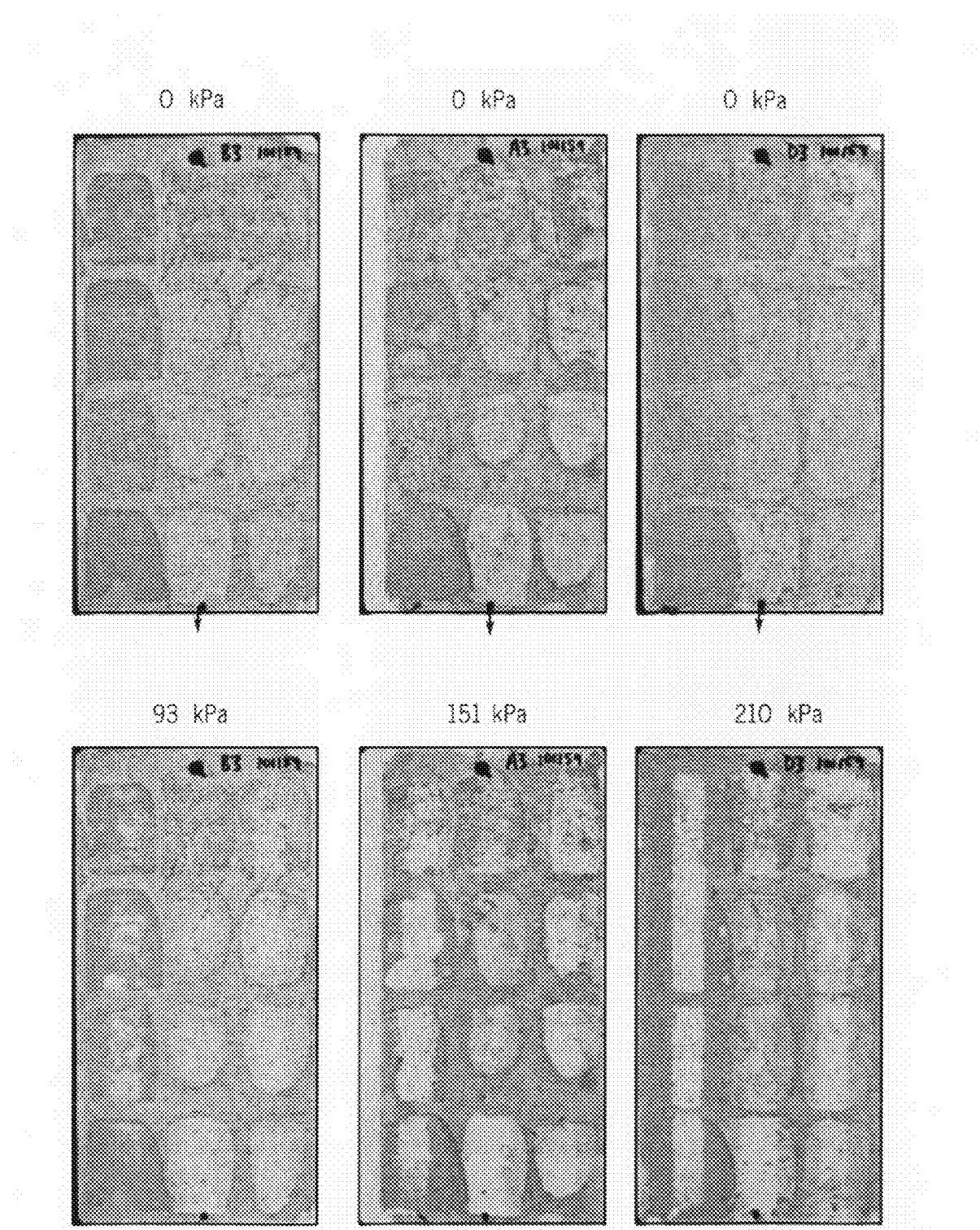
FIG. 30 shows panel 3 (B3, A3 and D3) before and after being sprayed at different impact pressure with the water jet.

Biomass removal using the water jet is presented in Tables XIII to XV below and FIGS. 28 to 30. Table XIII shows the percentage removal from panel 1 (B1, A1 and D1) at different impact pressure using the water jet; the two values for the standards are the scores for the duplicate patches on each panel. A1 had been sprayed at 54 kPa and then at 151 kPa.

Table XIV shows percentage removal from panel 2 (B2, A2 and D2) at different impact pressure using the water jet; the two values for the standards are the scores for the duplicate patches on each panel. Table XV shows percentage removal from panel 3 (B3, A3 and D3) at different impact pressure using the water jet; the two values for the standards are the scores for the duplicate patches on each panel.

TABLE XIII

Panel 1

% removal of biomass at different impact pressures

| Date: 25 Oct. 2005 | 54 kPa A1 | 93 kPa B1 | 151 kPa A1 | 210 kPa D1 |
|---|---|---|---|---|
| DC 3140 | 5 | 50 | 80:90 | 99 |
| T2 Silastic | 5 | 40:60 | 99 | 99 |
| PDMS-PU-1 | 0 | 10 | 20 | 60 |
| PDMS-PU-2 | 0 | 5 | 10 | 30 |
| PDMS-PU-3 | 0 | 30 | 10 | 70 |
| PDMS-PU-4 | 0 | 30 | 10 | 80 |
| PDMS-PU-5 | 0 | 60 | 40 | 95 |
| PDMS-PU-6 | 5 | 50 | 50 | 95 |
| PDMS-PU-7 | 60 | 99 | 99 | 99 |
| PDMS-PU-8 | 20 | 60 | 70 | 70 |

TABLE XIV

Panel 2

% removal of biomass

| Date: 25 Oct. 2005 | 93 kPa B2 | 151 kPa A2 | 210 kPa D2 |
|---|---|---|---|
| DC 3140 | 30:40 | 99 | 95 |
| T2 Silastic | 10:40 | 99 | 95:99 |
| PDMS-PU-9 | 0 | 5 | 10 |
| PDMS-PU-10 | 0 | 20 | 40 |
| PDMS-PU-11 | 10 | 20 | 40 |
| PDMS-PU-12 | 10 | 20 | 40 |
| PDMS-PU-13 | 10 | 30 | 40 |
| PDMS-PU-14 | 30 | 40 | 50 |
| PDMS-PU-15 | 50 | 90 | 90 |
| PDMS-PU-16 | 50 | 80 | 80 |

TABLE XV

Panel 3

% removal of biomass

| Date: 25 Oct. 2005 | 93 kPa B3 | 151 kPa A3 | 210 kPa D3 |
|---|---|---|---|
| DC 3140 | 30:40 | 60:80 | 80 |
| T2 Silastic | 20:40 | 60:80 | 80 |
| PDMS-PU-17 | 10 | 20 | 30 |
| PDMS-PU-18 | 30 | 30 | 50 |
| PDMS-PU-19 | 10 | 20 | 20 |
| PDMS-PU-20 | 30 | 40 | 50 |
| PDMS-PU-21 | 10 | 30 | 30 |
| PDMS-PU-22 | 30 | 50 | 60 |
| PDMS-PU-23 | 40 | 95 | 90 |
| PDMS-PU-24 | 30 | 50 | 40 |

Figure 31:
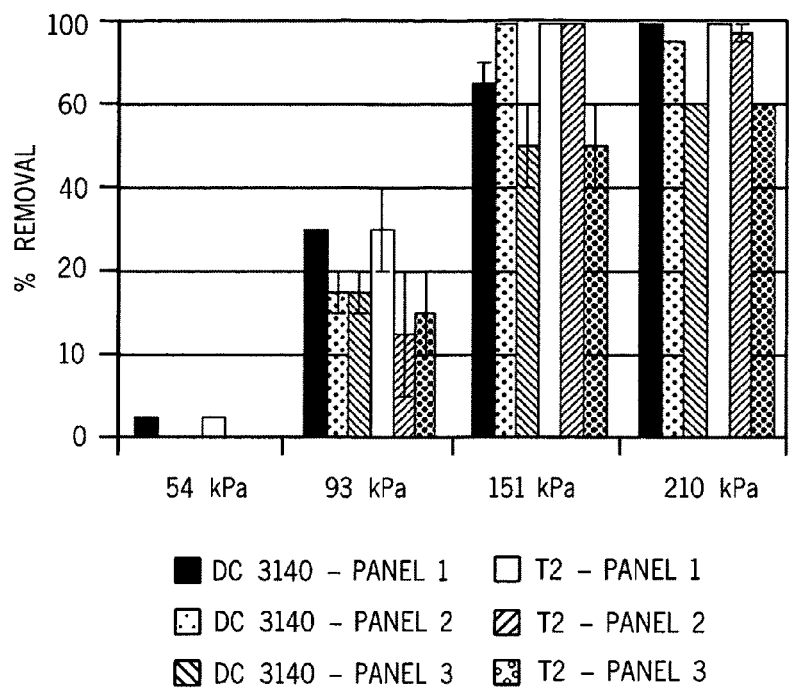
FIG. 31 shows percentage removal for the two replicate standards patches on panel A1, panel B (B1, B2, B3), panel A (A1, A2 and A3) and panel D (D1, D2 and D3) at 54 kPa, 93 kPa, 151 kPa and 210 kPa of impact pressures.
Figure 32:
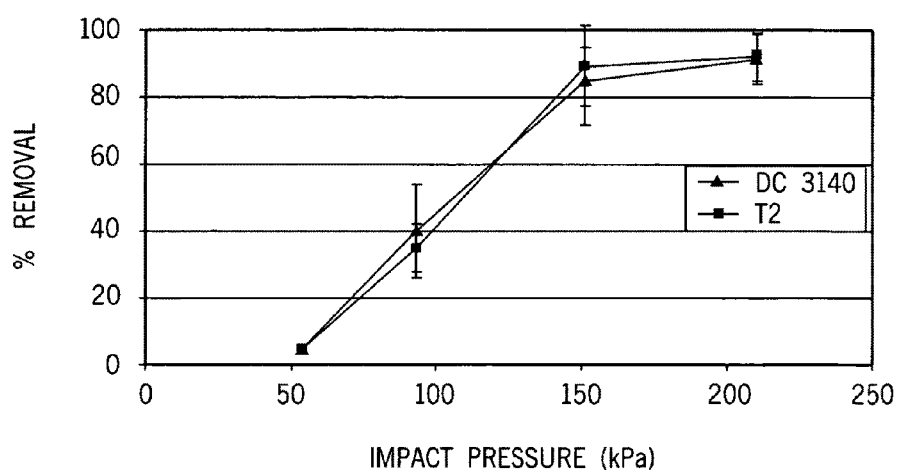
FIG. 32 shows 95% confidence limit derived from arcsine transformed data for the 6 replicate standards patches tested per pressure.
Figure 33:
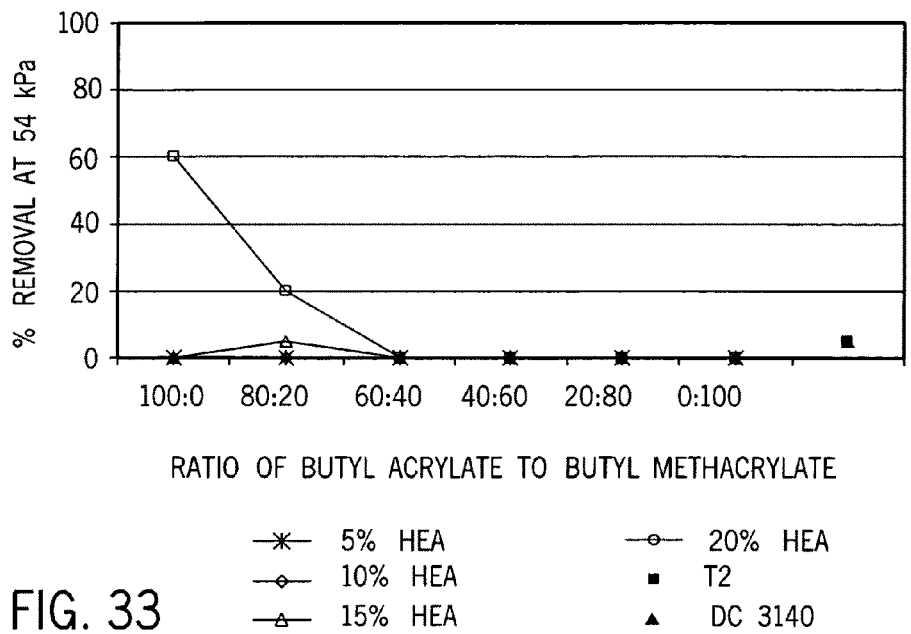
FIG. 33 shows percentage removal from panel A1 at 54 kPa of impact pressure using the water jet; bars show 95% confidence limits derived from arcsine transformed data for the 6 replicate standards patches tested per pressure.
Figure 34:
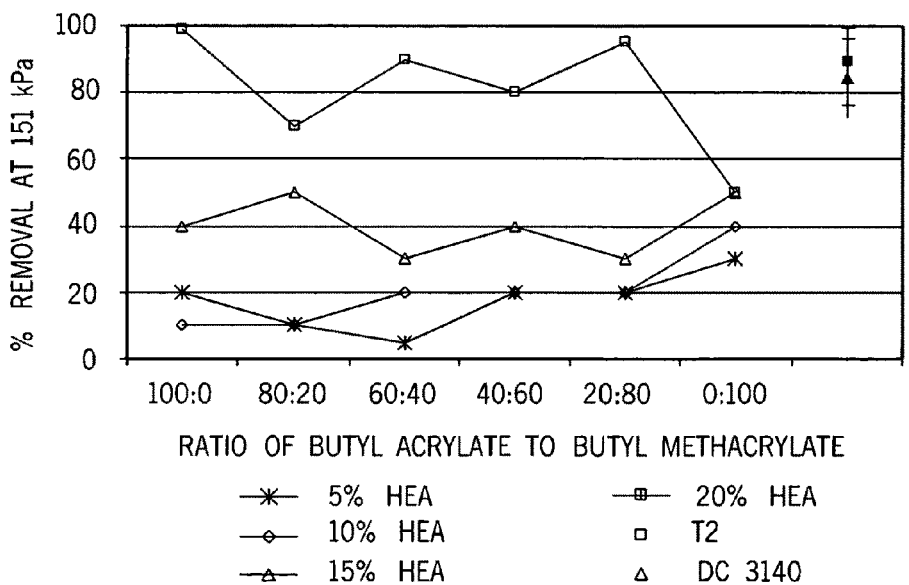
FIG. 34 shows percentage removal from panels A1, A2 and A3 at 151 kPa of impact pressure using the water jet; bars show 95% confidence limits derived from arcsine transformed data for the 6 replicate standards patches tested per pressure.
Figure 35:
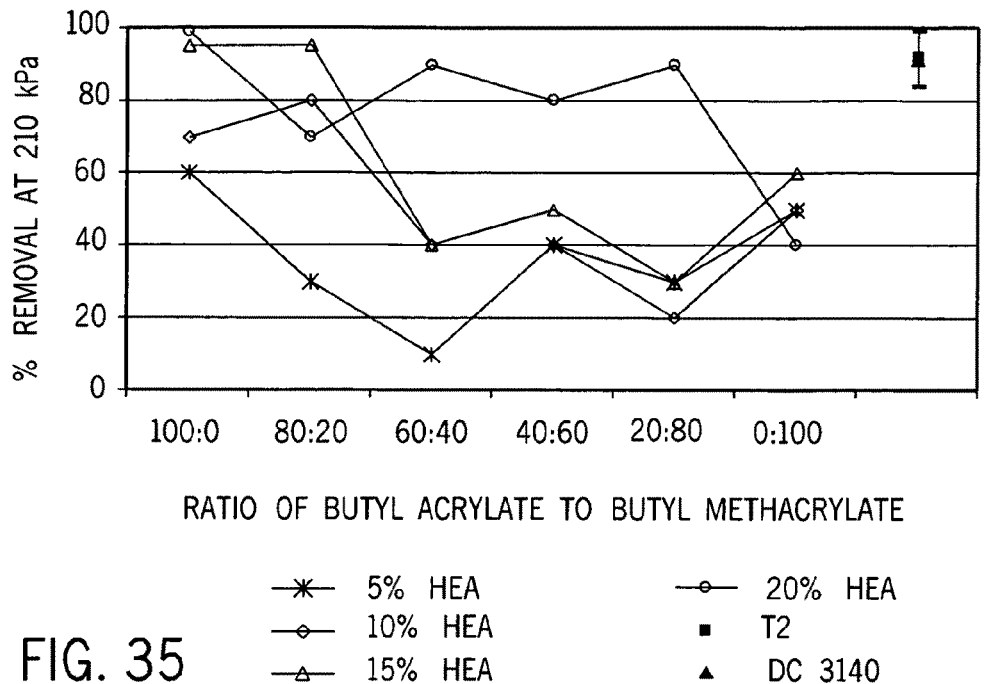
FIG. 35 shows percentage removal from panels D1, D2, D3 at 210 kPa of impact pressure using the water jet; bars show 95% confidence limits derived from arcsine transformed data for the 6 replicate standards patches tested per pressure.
Figure 36:
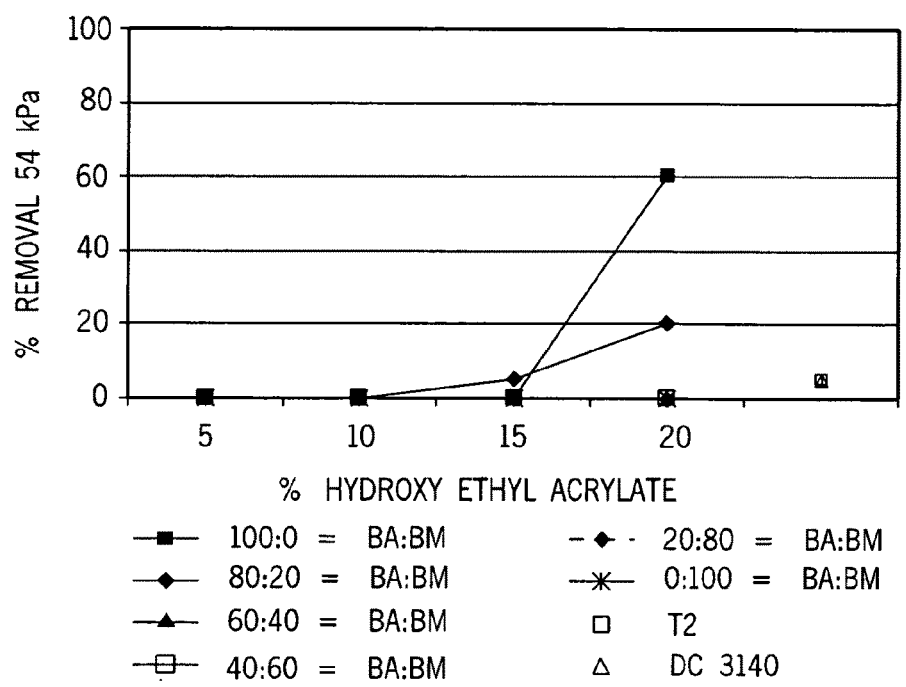
FIG. 36 shows percentage removal from panel A1 at 54 kPa of impact pressure using the water jet; bars show 95% confidence limits derived from arcsine transformed data for the 6 replicate standards patches tested per pressure.
Figure 37:
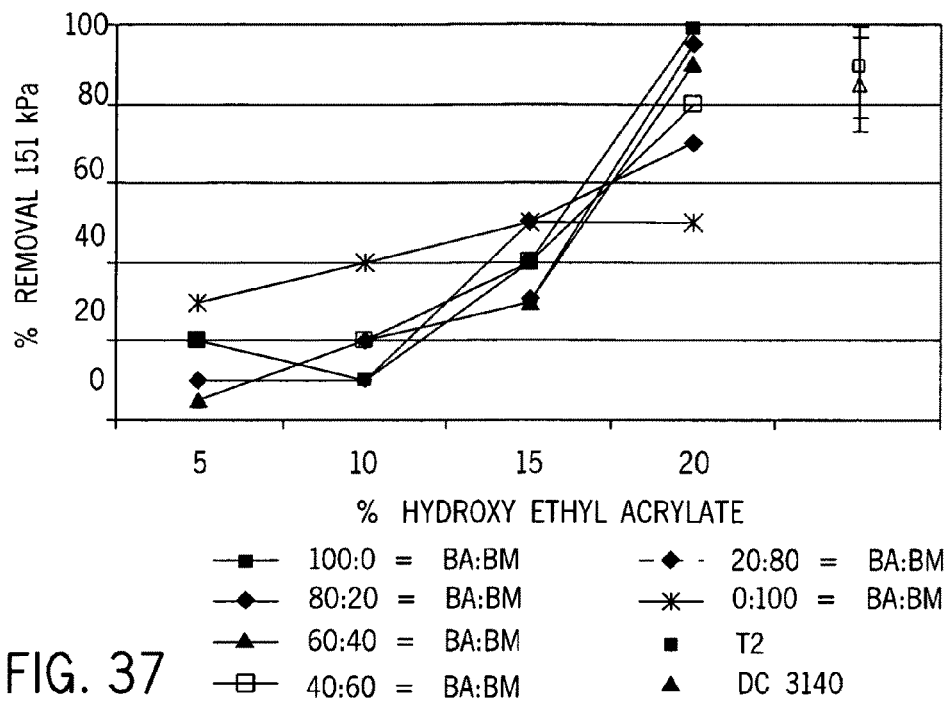
FIG. 37 shows percentage removal from panels A1, A2 and A3 at 151 kPa of impact pressure using the water jet; bars show 95% confidence limits derived from arcsine transformed data for the 6 replicate standards patches tested per pressure.
Figure 38:
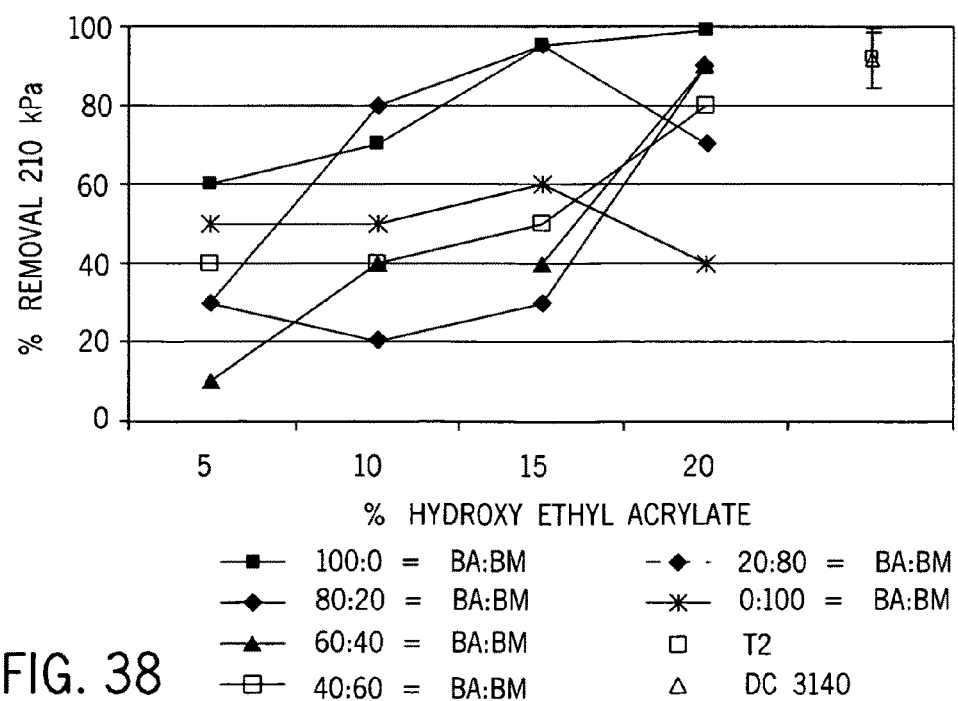
FIG. 38 shows percentage removal from panels D1, D2, D3 at 210 kPa of impact pressure using the water jet; bars show 95% confidence limits derived from arcsine transformed data for the 6 replicate standards patches tested per pressure.

The sporelings appeared to be well adhered to the silicone standards (DC3140 and T2) since only 40% removal was obtained at 93 kPa of impact pressure (FIGS. 31 and 32). This may be partly because the films were quite thin, nominally 45-74 μm, and as shown on the photographs, the surface area of the standard silicones was relatively large suggesting these coatings were thinner than the experimental samples. Percentage removal from DC3140 and T2 was similar. However, it was observed that air bubbles were trapped under some T2 patches suggesting poor adhesion to the primer. The air bubbles may have arisen from oxygen generated by photosynthesis passing through the silicone. The coating surface broke up when the area with bubbles was hosed.

Figure 24:
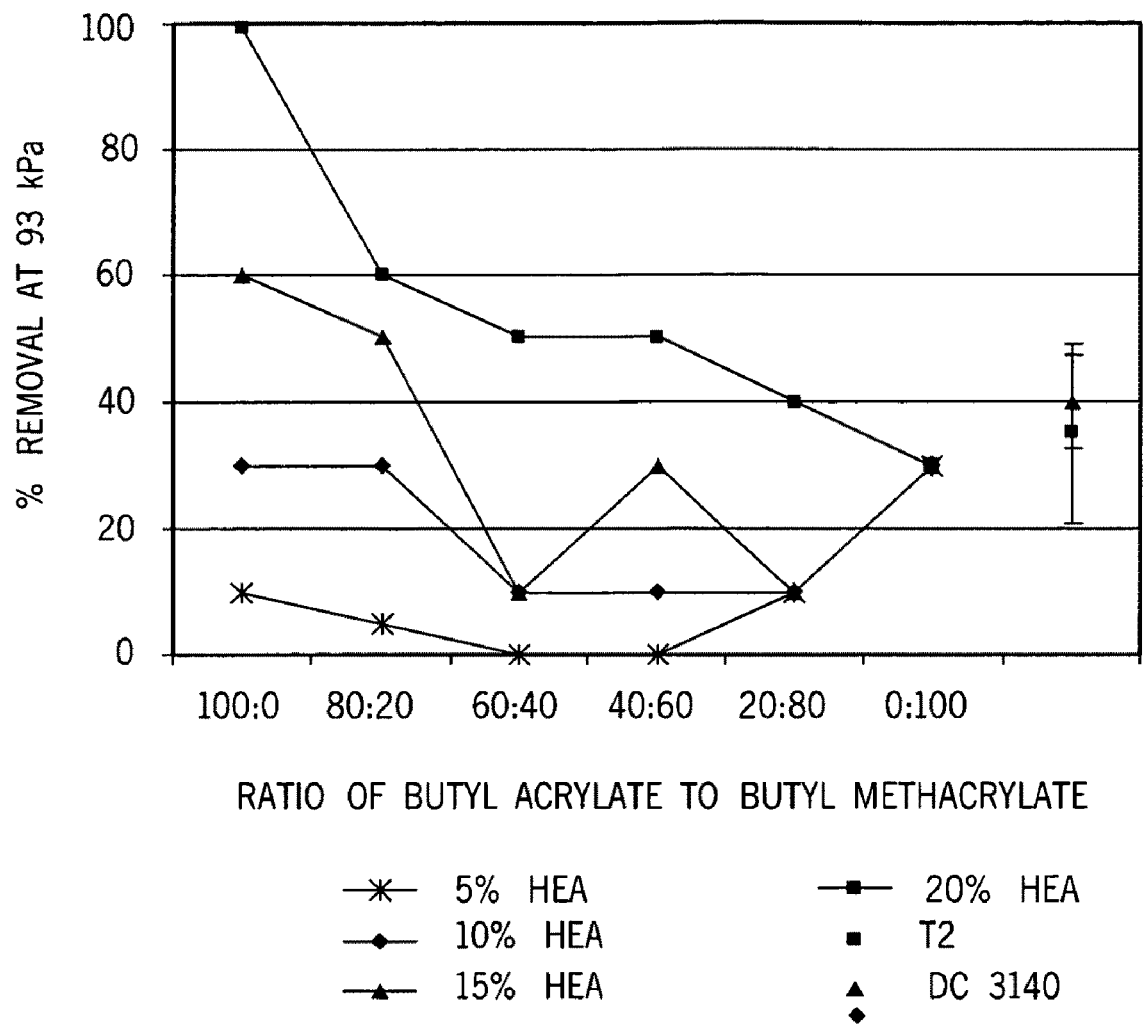
FIG. 24 shows percentage removal from panel B1, B2 and B3 at 93 kPa of impact pressure using the water jet wherein bars show 95% confidence limits derived from arcsine transformed data for the 6 replicate standards patches on the three panels.
Figure 25:
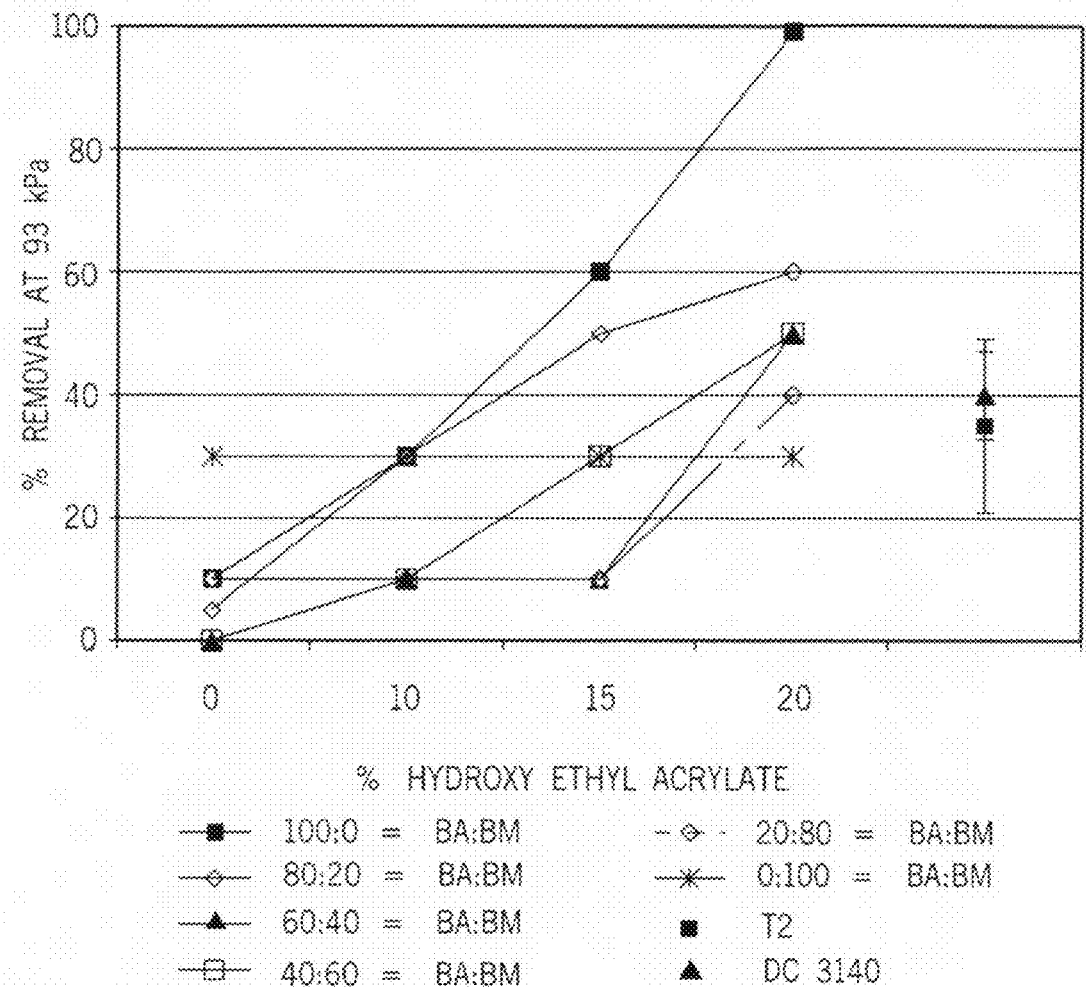
FIG. 25 shows percentage removal from panel B1, B2 and B3 at 93 kPa of impact pressure using the water jet wherein bars show 95% confidence limits derived from arcsine transformed data, for the 6 replicate standards patches on the three panels.

Results presented in FIG. 24 and FIGS. 33 to 35 show the influence of the ratio of Butyl Acrylate to Butyl Methacrylate (BA:BM) on the release properties of the coatings. FIG. 24 shows the results for panels hosed at 93 kPa. The results indicate that the percentage removal of biomass decreases as the ratio of BA decreases and BM increases.

Results presented in FIG. 25 and FIGS. 36 to 38 show the influence of 2-Hydroxy Ethyl Acrylate (HEA) on the release properties of the coatings, FIG. 24 shows the results for panels hosed at 93 kPa. Removal of biomass increases when the percentage of HEA increases.

Figure 26:
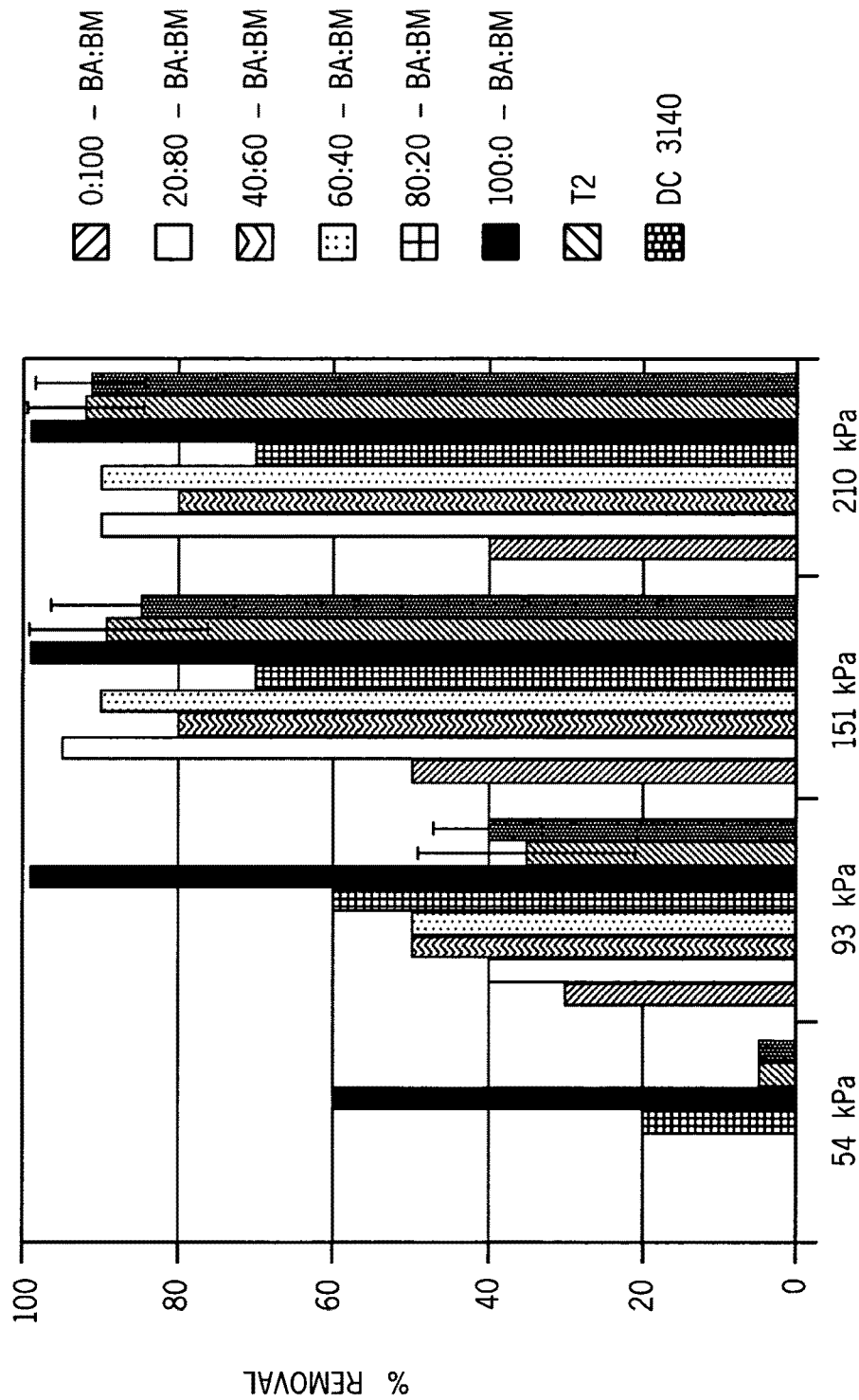
FIG. 26 shows percentage removal from coatings with 20% HEA at different impact pressure generated by the water jet wherein bars show 95% confidence limits derived from arcsine transformed data for the 6 replicate standard patches tested per impact pressure.

The trends are seen more clearly when only one parameter is changed. Thus, FIG. 26 shows the influence of the ratio of BA:BM on sporeling removal for coatings with 20% HEA. Increasing the ratio of BA:BM facilitates easier removal. Coatings with the lowest removal have a low ratio of BA:BM. The highest removal is always for the formulation BA:BM=100:0, which displays greater fouling release than either of the standard silicones.

Figure 27:
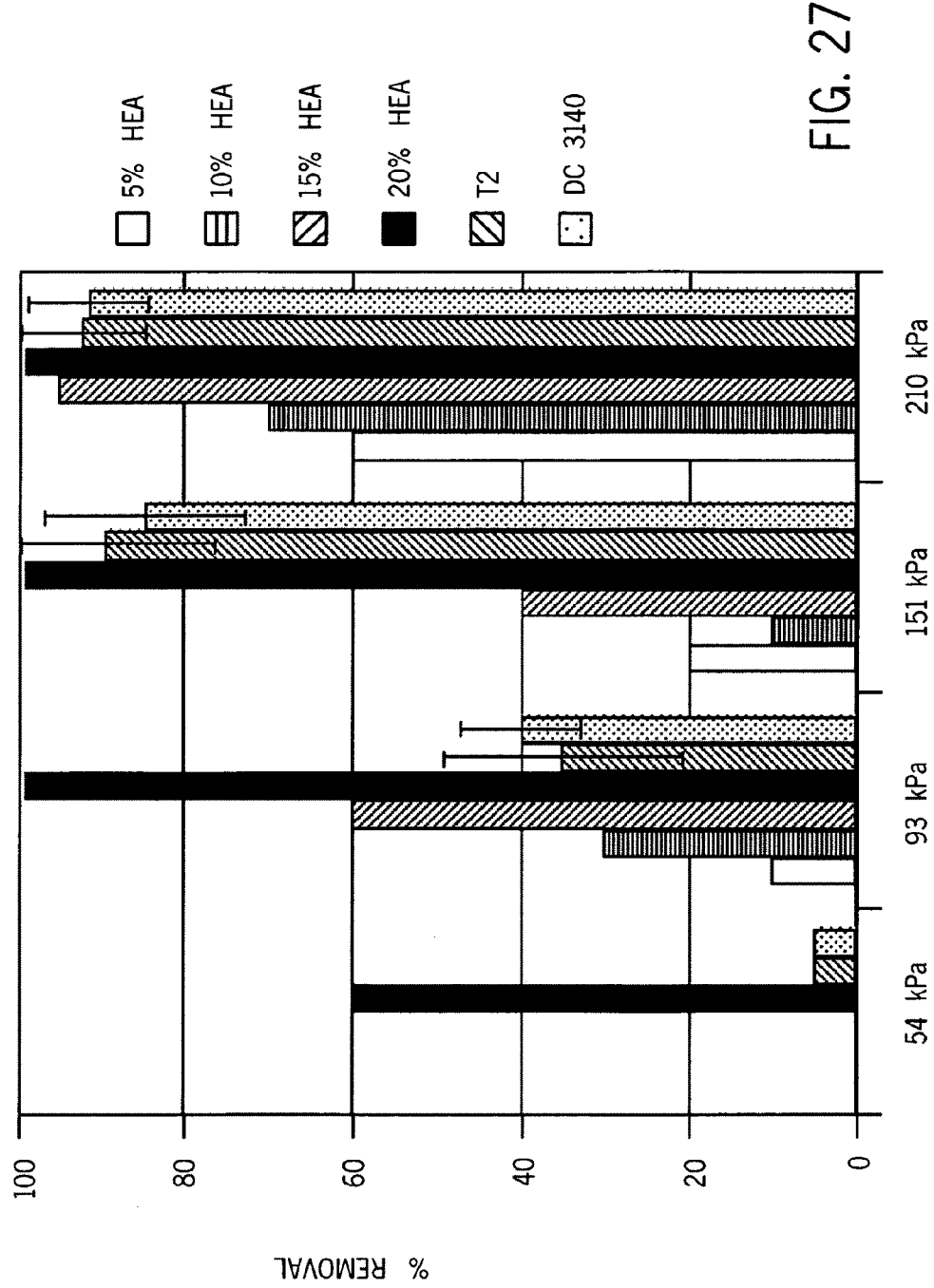
FIG. 27 shows percentage removal from coatings with a ratio BA:BM=100:0, at different impact pressure using the water jet wherein bars show 95% confidence limits derived from arcsine transformed data, for the 6 replicate standards patches tested per impact pressure.

FIG. 27 shows the influence of HEA on biomass removal for coatings with a ratio BA:BM=100:0. Increasing the percentage of HEA enhances release. The lowest release was obtained for the coating with 5% HEA. The best coating had 20% HEA, which showed better release performance than either T2 or DC3140.

Conclusions

Increasing the percentage of Butyl Acrylate and Hydroxy Ethyl Acrylate in the acrylic polyol improved the release properties of the coating. The results for the coatings with 20% Hydroxy Ethyl Acrylate and only butyl acrylate are very interesting and should be investigated further. The results obtained with the PDMS-PU-7 (HEA:BA:BM=20:80:0) show good fouling release properties and should be compared to a more efficient fouling release coating such as Intersleek. Differences in thickness between the experimental coatings and silicone standards should be avoided. It will be interesting to compare the data with those obtained for other organisms in both laboratory and field assays.

Exemplary Embodiments

Reference is made in the following to a number of illustrative embodiments of the subject matter described herein. The following embodiments describe illustrative embodiments that may include the various features, characteristics, and advantages of the subject matter as presently described. Accordingly, the following embodiments should not be considered as being comprehensive of all of the possible embodiments.

A method (A) of inhibiting fouling on a boat hull comprising applying a fouling release coating composition to at least a portion of said hull;

wherein the coating composition comprises a polymeric material prepared by reacting a mixture comprising:
an amino functional polyorganosiloxane having a molecular weight of at least about 2000;
polyisocyanate; and
polyol.

The polymeric material of embodiment A having an initial water contact angle of at least about 70°. The polymeric material of embodiment A having an initial water contact angle of at least about 80°. The polymeric material of embodiment A having an initial water contact angle of at least about 90°. The polymeric material of embodiment A wherein the water contact angle changes no more than about 20° after immersion in deionized water for 30 days. The polymeric material of embodiment A wherein the water contact angle changes no more than about 15° after immersion in deionized water for 30 days. The polymeric material of embodiment A wherein the water contact angle changes no more than about 10° after immersion in deionized water for 30 days. The polymeric material of embodiment A having an initial pull off adhesion release force of no more than about 80 N. The polymeric material of embodiment A having an initial pull off adhesion release force of no more than about 60 N. The polymeric material of embodiment A having an initial pull off adhesion release force of no more than about 50 N. The polymeric material of embodiment A having an initial pull off adhesion release force of no more than about 30 N. The polymeric material of embodiment A having an initial pull off adhesion release force of no more than about 15 N.

The polymeric material of embodiment A comprising about 5 wt % to 30 wt % of the amino functional polyorganosiloxane. The polymeric material of embodiment A wherein the polyol comprises polycaprolactone polyol. The polymeric material of embodiment A wherein the polyol comprises hydroxy-functional poly(meth)acrylate. Optionally, the hydroxy-functional poly(meth)acrylate is formed from a monomer mixture comprising hydroxyalkyl acrylate and alkyl acrylate.

Optionally, the hydroxy-functional poly(meth)acrylate is formed from a monomer mixture comprising hydroxyalkyl acrylate, alkyl acrylate and alkyl methacrylate. The polymeric material of embodiment A comprising about 30 wt % to 85 wt % of polyisocyanate. The polymeric material of embodiment A wherein the polyisocyanate has an average isocyanate equivalent weight of about 150 to 600, and desirably about 250 to 450. The polymeric material of embodiment A comprising a polycaprolactone polyol wherein the polycaprolactone polyol comprises polycaprolactone triol having an average hydroxyl equivalent weight of about 150 to 200. Optionally, the polyisocyanate comprises isophorone diisocyanate, hexamethylene diisocyanate, oligomers thereof or a mixture thereof.

A boat hull (B) having fouling release coating on a surface thereof; wherein the coating comprises a polymeric material prepared by reacting a mixture comprising:
  an amino functional polyorganosiloxane having a molecular weight of at least about 2000;
  polyisocyanate; and
  polyol.

A polymeric material (C) prepared by reacting a mixture comprising:
  an amino functional polyorganosiloxane having a molecular weight of at least about 2000;
  polyisocyanate; and
  polyol, which comprises hydroxy-functional poly(meth)acrylate. Optionally, the hydroxy-functional poly(meth)acrylate is formed from a monomer mixture comprising hydroxyalkyl acrylate and alkyl acrylate. Optionally, the hydroxy-functional poly(meth)acrylate includes hydroxyethyl acrylate/butyl acrylate copolymer.

A polymeric material (D) prepared by reacting a mixture comprising:
  an amino functional polyorganosiloxane having a molecular weight of at least about 2000;
  polyisocyanate; and
  polyol. Optionally, the ratio of isocyanate groups to hydroxyl plus amino groups in the mixture is at least 1.0.

Optionally, the ratio of isocyanate groups to hydroxyl plus amino groups in the mixture is 1.05 to 1.2. Optionally, the amino functional polyorganosiloxane has a average molecular weight of no more than about 50,000, preferably about 5,000-30,000, and more preferably about 10,000 to 25,000. Optionally, the polyol includes polyol having at least three hydroxy groups and/or the polyisocyanate includes diisocyanate trimer.

A cross linked polymeric material (E) prepared by reacting a composition comprising:
  polyol;
  polyisocyanate;
  and polyorganosiloxane having functional groups capable of reacting with the polyisocyanate;
  wherein the polyorganosiloxane has a weight average molecular weight of at least about 2,000. Optionally, the polyorganosiloxane is an amino functional polyorganosiloxane. Optionally, the polyorganosiloxane is an amino functional polydialkylsiloxane. Optionally, the polyorganosiloxane is an amino functional polydimethylsiloxane. Optionally, the polyorganosiloxane is an aminoalkyl terminated polydimethylsiloxane. Optionally, the polyol comprises polycaprolactone triol. Optionally, the polycaprolactone triol has an average hydroxyl equivalent weight of about 150 to 200. Optionally, the polyol comprises hydroxy-functional poly(meth)acrylate. Optionally, the hydroxy-functional poly(meth)acrylate includes an hydroxyalkyl acrylate/alkyl acrylate copolymer. Optionally, the hydroxy-functional poly(meth)acrylate is formed from a monomer mixture which includes (a) hydroxyethyl acrylate, hydroxypropyl acrylate or a mixture thereof; and (b) alkyl acrylate having from 4 to 8 carbon atoms. Optionally, the monomer mixture includes about 10 to 30 wt. % hydroxyalkyl acrylate. Optionally, the hydroxy-functional poly(meth)acrylate includes hydroxyethyl acrylate/butyl acrylate copolymer. Optionally, the polyisocyanate comprises an aliphatic diisocyanate trimer. Optionally, the polyisocyanate comprises hexamethylene diisocyanate trimer. Optionally, the polyisocyanate comprises isophorone diisocyanate trimer. Optionally, the ratio of isocyanate groups to hydroxyl plus amino groups in the mixture is 1.05 to 1.2.

A method of inhibiting fouling on a boat hull (F) comprising applying a fouling release coating composition to at least a portion of said hull;
  wherein the coating composition comprises a polymeric material prepared by reacting a mixture comprising:
    polyisocyanate;
    polyorganosiloxane having an average molecular weight of at least about 2000;
    the polyorganosiloxane having functional groups capable of reacting with the polyisocyanate; and
    polyol.

A boat hull (G) having fouling release coating on at least a portion of said hull; wherein the coating comprises a polymeric material prepared by reacting a mixture comprising:
  polyisocyanate; polyorganosiloxane having an average molecular weight of at least about 2000;
  the polyorganosiloxane having functional groups capable of reacting with the polyisocyanate; and
  polyol.

A method (H) of inhibiting fouling on a surface exposed to aquatic conditions comprising applying a fouling release coating composition to said surface;
  wherein the coating composition comprises:
    polyisocyanate;
    polyorganosiloxane having functional groups capable of reacting with the polyisocyanate; and polyol. Optionally, the polyorganosiloxane comprises amino functional polyorganosiloxane. Optionally, the polyol comprises polycaprolactone triol. Optionally, the polyol comprises hydroxy-functional poly(meth)acrylate. Optionally, the polyisocyanate comprises hexamethylene diisocyanate trimer, isophorone diisocyanate trimer or a mixture thereof. Optionally, the surface exposed to aquatic conditions is a surface exposed to salt water. Optionally, the surface exposed to aquatic conditions is a surface exposed to fresh water.

A surface (I) exposed to aquatic conditions having fouling release coating on a surface thereof; wherein the coating comprises a polymeric material prepared by reacting a mixture comprising:
polyisocyanate;
polyorganosiloxane having functional groups capable of reacting with the polyisocyanate; and
polyol. Optionally, the surface is exposed to salt water. Optionally, the surface is exposed to fresh water.

A method (J) of inhibiting fouling by algae (such as Ulva sporelings) on a surface exposed to aquatic conditions comprising applying a fouling release coating composition to said surface;
wherein the coating composition comprises:
polyisocyanate;
polyorganosiloxane having functional groups capable of reacting with the polyisocyanate; and
polyol.

A polymeric material (K) prepared by reacting a mixture comprising:
polyorganosiloxane having functional groups capable of reacting with the polyisocyanate, wherein the polyorganosiloxane comprises polycaprolactone-poly(dimethyl siloxane)-polycaprolactone triblock copolymer;
polyisocyanate; and
polyol.

A method (L) of inhibiting fouling by algae (such as Ulva sporelings) on a surface exposed to aquatic conditions comprising applying a fouling release coating composition to said surface;
wherein the coating composition comprises:
polyorganosiloxane having functional groups capable of reacting with the polyisocyanate, wherein the polyorganosiloxane comprises polycaprolactone-poly(dimethyl siloxane)-polycaprolactone triblock copolymer;
polyisocyanate; and
polyol.

A substrate (M) having fouling release coating on at least a portion of said hull; wherein the coating comprises a polymeric material prepared by reacting a mixture comprising:
polyorganosiloxane having functional groups capable of reacting with the polyisocyanate, wherein the polyorganosiloxane comprises polycaprolactone-poly(dimethyl siloxane)-polycaprolactone triblock copolymer;
polyisocyanate; and
polyol.

What is claimed is:
1. A substrate having a surface capable of being exposed to aquatic conditions; wherein the surface has a fouling release coating thereon; and the coating comprises a polymeric material prepared by reacting a mixture comprising:
an amino functional polyorganosiloxane comprising aminoalkyl terminated polydimethylsiloxane;
polyisocyanate; and
polyol, which comprises hydroxy-functional poly(meth) acrylate;
wherein the polyisocyanate comprises hexamethylene diisocyanate trimer, isophorone diisocyanate trimer or a mixture thereof; and the hydroxy-functional poly(meth) acrylate is formed from a monomer mixture comprising hydroxyalkyl acrylate and alkyl acrylate; and
the fouling release coating has an initial water contact angle of at least about 90°.

2. The substrate of claim 1, wherein the hydroxy-functional poly(meth)acrylate includes hydroxyethyl acrylate/butyl acrylate copolymer.

3. The substrate of claim 1 wherein the water contact angle of the release coating changes no more than about 20° after immersion in deionized water for 30 days.

4. The substrate of claim 1, wherein the amino functional polyorganosiloxane has a average molecular weight of about 5,000 to 50,000.

5. The substrate of claim 1, wherein the polymeric material prepared by reacting a mixture which includes about 30 wt. % to 85 wt. % of the polyisocyanate.

6. A polymeric material prepared by reacting a mixture comprising:
an amino functional polyorganosiloxane, which comprises aminoalkyl terminated polydimethylsiloxane;
polyisocyanate; and
polyol, which comprises hydroxy-functional poly(meth) acrylate;
wherein the polyisocyanate comprises hexamethylene diisocyanate trimer, isophorone diisocyanate trimer or a mixture thereof; and the ratio of isocyanate groups to hydroxyl plus amino groups in the mixture is 1.05 to 1.2; and
the hydroxy-functional poly(meth)acrylate is formed from a monomer mixture comprising (a) hydroxyalkyl acrylate, which includes hydroxyethyl acrylate, hydroxypropyl acrylate or a mixture thereof; and (b) alkyl acrylate having from 4 to 8 carbon atoms; and the monomer mixture includes about 10 to 30 wt. % of the hydroxyalkyl acrylate.

7. The polymeric material of claim 6 wherein the aminoalkyl terminated polydimethylsiloxane comprises bis-(aminopropyl terminated) polydimethylsiloxane.

8. The substrate of claim 1, wherein the fouling release coating has a water contact angle which changes no more than about 10° after immersion in deionized water for 30 days.

9. A method of inhibiting fouling on a surface exposed to aquatic conditions comprising applying a fouling release coating composition to the surface;
wherein the coating composition comprises:
an amino functional polyorganosiloxane, which comprises aminoalkyl terminated polydimethylsiloxane;
polyisocyanate; and
polyol, which comprises acrylic polyol;
wherein the polyisocyanate comprises hexamethylene diisocyanate isophorone diisocyanate trimer or a mixture thereof; and
the fouling release coating composition forms a coating on the surface, which has an initial water contact angle of at least about 90°.

10. The method of claim 9, wherein the amino functional polyorganosiloxane has an average molecular weight of about 5,000 to 50,000.

11. A polymeric material prepared by reacting a mixture comprising:
an amino functional polyorganosiloxane, which comprises aminoalkyl terminated polydimethylsiloxane;
polyisocyanate; and
polyol, which comprises acrylic polyol;
wherein a coating formed from the polymeric material has an initial water contact angle of at least about 90°.

12. The polymeric material of claim 11, wherein the polyisocyanate comprises hexamethylene diisocyanate trimer, isophorone diisocyanate trimer or a mixture thereof.

13. The polymeric material of claim 11, wherein the acrylic polyol comprises hydroxy-functional poly(meth)acrylate.

14. The polymeric material of claim 11, wherein the polyol further comprises polyester polyol.

15. The polymeric material of claim 11, wherein the ratio of isocyanate groups to hydroxyl plus amino groups in the mixture is 1.05 to 1.2.

16. The polymeric material of claim 11, wherein the aminoalkyl terminated polydimethylsiloxane has an average molecular weight of about 5,000 to 50,000.

17. The polymeric material of claim 11, wherein the water contact angle changes no more than about 10° after immersion in deionized water for 30 days.

18. The polymeric material of claim 11, wherein said polymeric material comprises 5 to 30 wt. % subunits derived from the amino functional polyorganosiloxane.

19. A substrate having a surface capable of being exposed to aquatic conditions; wherein the surface has a fouling release coating thereon; and the coating comprises a polymeric material prepared by reacting a mixture comprising:

an amino functional polyorganosiloxane, which comprises aminoalkyl terminated polydimethylsiloxane;
polyisocyanate; and
polyol, which comprises acrylic polyol;
wherein the fouling release coating has an initial water contact angle of at least about 90°.

20. The substrate of claim 19, wherein the acrylic polyol comprises hydroxy-functional poly(meth)acrylate.

21. The substrate of claim 19, wherein the polyol further comprises polyester polyol.

22. The substrate of claim 19, wherein the polyisocyanate comprises hexamethylene diisocyanate trimer, isophorone diisocyanate trimer or a mixture thereof.

23. The substrate of claim 19, wherein the fouling release coating has a water contact angle which changes no more than about 10° after immersion in deionized water for 30 days.

24. The substrate of claim 19, wherein the aminoalkyl terminated polydimethylsiloxane has a average molecular weight of about 5,000 to 50,000.

25. The polymeric material of claim 6 wherein a coating formed from the polymeric material has an initial water contact angle of at least about 90°.

* * * * *